(12) United States Patent
Takahashi et al.

(10) Patent No.: US 7,103,467 B2
(45) Date of Patent: Sep. 5, 2006

(54) DEVICE FOR DETECTING RESPONSE CHARACTERISTICS OF SENSOR

(75) Inventors: Yuri Takahashi, Kariya (JP); Hisashi Iida, Kariya (JP); Shuujirou Morinaga, Takahama (JP); Naoki Yoshiume, Takakama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/089,333

(22) Filed: Mar. 25, 2005

(65) Prior Publication Data

US 2005/0216175 A1    Sep. 29, 2005

(30) Foreign Application Priority Data

Mar. 25, 2004  (JP)  ............................. 2004-090178
Nov. 30, 2004  (JP)  ............................. 2004-345072

(51) Int. Cl.
*F02D 45/00*  (2006.01)
*G06F 17/00*  (2006.01)

(52) U.S. Cl. ...................... 701/109; 73/117.3; 123/691

(58) Field of Classification Search ................ 701/109, 701/108, 110, 114; 123/691, 688, 672; 60/274, 60/276, 285; 73/117.3, 116, 118.1
See application file for complete search history.

(56) References Cited

U.S. PATENT DOCUMENTS 5,179,929 A * 1/1993 Miyashita et al. .......... 123/688
5,426,935 A * 6/1995 Ogawa et al. .............. 123/691
5,672,817 A   9/1997 Sagisaka et al. ........... 73/118.1

FOREIGN PATENT DOCUMENTS

JP          57-62945       *  4/1982

* cited by examiner

*Primary Examiner*—Hieu T. Vo
(74) *Attorney, Agent, or Firm*—Nixon & Vanderhye P.C.

(57) ABSTRACT

When the output of the AFR ratio sensor is stable in a steady operating state, the amount of fuel is increased by step inputting to detect a point where the gradient of change in the sensor output exceeds a threshold value as a point of start of change. The time from the timing of increasing the fuel until the point of start of change is detected as a dead time. A response time is calculated until the amount of change in the sensor output reaches a predetermined ratio of the amount of change (AA−BA) of up to the steady value AA of the sensor output after the amount of the fuel is increased from the steady value BA of the sensor output before the amount of the fuel is increased. The fail condition in the AFR ratio sensor is determined based on the dead time TA and the response time TB.

36 Claims, 15 Drawing Sheets on Mar. 25, 2004 and No. 2004-345072 filed on Nov. 30, 2004, the disclosure of which are incorporated herein by reference.

DEVICE FOR DETECTING RESPONSE CHARACTERISTICS OF SENSOR

CROSS-REFERENCE TO RELATED APPLICATION

This application is based on Japanese Patent Applications No. 2004-90178 filed on Mar. 25, 2004 and No. 2004-345072 filed on Nov. 30, 2004, the disclosure of which are incorporated herein by reference.

FIELD OF THE INVENTION

This invention relates to a device for detecting response characteristics of a sensor in an air-fuel ratio control system which controls by feedback the amount of the fuel fed into an internal combustion engine based on the output of the sensor that detects the air-fuel ratio or the oxygen concentration of the exhaust gas emitted from the internal combustion engine.

BACKGROUND OF THE INVENTION

In modern electronically controlled automobiles, a sensor is provided in an exhaust pipe to detect the air-fuel ratio or the oxygen concentration of the exhaust gas emitted from an internal combustion engine, and the amount of the fuel fed to the internal combustion engine is controlled by feedback relying upon the sensor output, so that the air-fuel ratio of the exhaust gas is maintained near a target air-fuel ratio in order to improve the engine performance such as emission of the exhaust gas and the fuel efficiency. The modern air-fuel ratio feedback control systems are designed by modeling the response characteristics according to which the air-fuel ratio of the exhaust gas varies following a change in the amount of feeding the fuel which is the object to be controlled, after the dead time+1st-order delay characteristics (or 2nd-order delay characteristics). Therefore, if the response characteristics of the sensor vary due to deteriorated characteristics of the sensor that detects the air-fuel ratio of the exhaust gas or due to the faulty sensor, the precision for detecting the air-fuel ratio is deteriorated and, hence, the precision for controlling the air-fuel ratio is deteriorated, causing a deterioration in the engine performance.

JP-8-177575A discloses a method according to which a change in the sensor output (rate of change) is detected after having detected a change in the amount of fuel fed into the internal combustion engine (beginning of fuel cut or end of fuel cut) to determine the deterioration in the response characteristics of the sensor.

According to the method of detecting sensor response characteristics disclosed in JP-8-177575A, however, a change in the sensor output is simply detected after a change in the amount of fuel supply without detecting the response characteristics (dead time and the 1st-order delay characteristics or the 2nd-order delay characteristics) on which the design of the air-fuel ratio feedback control system is based. It is therefore difficult to precisely detect the deterioration in the air-fuel ratio feedback controllability caused by the deteriorated response characteristics of the sensor or by the faulty sensor. Further, the above method is not detecting the response characteristics (dead time and the 1st-order delay characteristics or the 2nd-order delay characteristics) on which the design of the air-fuel ratio feedback control system is based. It is therefore difficult to detect the response characteristics or to correct the air-fuel ratio feedback control parameter relying upon the response characteristics that are detected.

SUMMARY OF THE INVENTION

It is therefore a first object of this invention to precisely detect deterioration in the air-fuel ratio feedback controllability caused by the deteriorated response characteristics of the sensor or by the faulty sensor by detecting the response characteristics (dead time and n-order delay characteristics) on which the design of the air-fuel ratio feedback control system is based. A second object of the invention is to precisely detect a fail condition in the sensor, and a third object of the invention is to properly correct an air-fuel ratio feedback control parameter depending the sensor response characteristics.

In order to achieve the above first object according to the invention, a timing of changing the amount of the fuel fed to an internal combustion engine is determined by fuel changing timing determining means, the behavior of the sensor output before and after the change in the amount of feeding the fuel is monitored by the reply characteristics detecting means and the response characteristics of the sensor are detected being divided into a dead time from when the amount of feeding the fuel is changed until when the sensor output starts changing and the subsequent n-order delay characteristics (n is a positive integer) representing a change in the sensor output characteristics. According to this constitution, the response characteristics of the sensor are detected being divided into the dead time and the n-order delay characteristics. It is therefore made possible to detect the response characteristics (dead time and n-order delay characteristics) on which the design of the air-fuel ratio feedback control system is based, and to precisely detect the deterioration in the air-fuel ratio feedback controllability caused by the deteriorated response characteristics of the sensor or by the faulty sensor.

In order to achieve the above second object, further, the presence of a fail condition in the sensor is determined by fail condition determining means based on at least either the dead time or the n-order delay characteristics detected by the step response characteristics detecting means. That is, a relationship between the dead time and the n-order delay characteristics varies depending upon the fail mode of the sensor. Therefore, if the fail condition is diagnosed being divided into the dead time and the n-order delay characteristics, a fail mode which could not be detected so far can now be detected contributing to improving the precision for diagnosing the fail condition of the sensor.

To achieve the above third object, further, the air-fuel ratio feedback control parameter may be varied or corrected based on at least either the dead time or the n-order delay characteristics detected by the step response characteristics detecting means. Therefore, the air-fuel ratio feedback control parameter can be properly corrected depending upon a change in the response characteristics (dead time and n-order delay characteristics) in the modern general air-fuel ratio feedback control systems, to improve the precision for controlling the air-fuel ratio.

DESCRIPTION OF THE PREFERRED EMBODIMENTS

The best mode for putting the invention into practice will now be described by way of embodiments 1 to 3.

Embodiment 1

Figure 1:
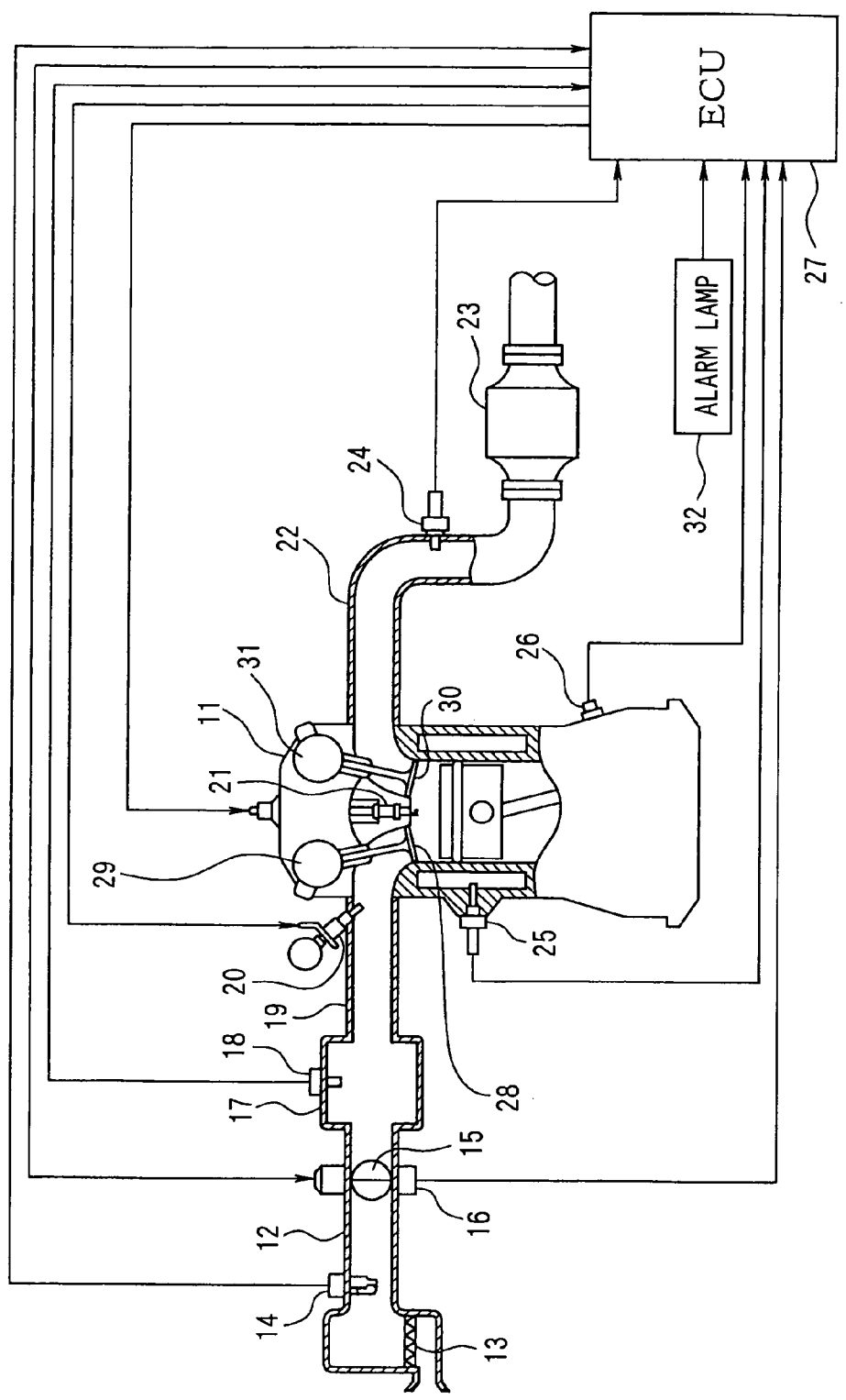
FIG. 1 is a diagram schematically illustrating the constitution of an engine control system as a whole according to an embodiment 1 of the invention.

An embodiment 1 in which the invention is applied to an intake port injection engine will now be described with reference to FIGS. 1 to 9. First, FIG. 1 schematically illustrates the constitution of an engine control system as a whole. An air cleaner 13 is provided at the most upstream portion of an intake pipe 12 of an engine 11 which is an internal combustion engine, and an air flow meter 14 is provided on the downstream of the air cleaner 13 for detecting the amount of the air taken in. On the downstream of the air flow meter 14, there are provided a throttle valve 15 of which the opening degree is adjusted by a motor 10 and a throttle-opening sensor 16 for detecting the throttle opening degree. Further, a surge tank 17 is provided on the downstream of the throttle valve 15, and an intake pipe pressure sensor 18 is provided in the surge tank 17 to detect the pressure in the intake pipe. The surge tank 17 is further provided with an intake manifold 19 for introducing the air into the cylinders of the engine 11, and a fuel injector 20 is provided near the intake port of the intake manifold 19 for each cylinder to inject the fuel therein. Further, a spark plug 21 is provided at the cylinder head of the engine 11 for each cylinder, and the mixture in the cylinder is ignited by a spark discharge of the spark plug 21.

Further, an intake valve 28 of the engine 11 is provided with a variable intake valve timing mechanism 29 for varying the timing for opening and closing the intake valve 28 (for varying the intake valve timing), and an exhaust valve 30 is provided with a variable exhaust valve timing mechanism 31 for varying the timing for opening and closing the exhaust valve 30 (for varying the exhaust valve timing).

An exhaust pipe 22 of the engine 11 is provided with a catalyst 23 such as a three-way catalyst for removing CO, HC, NOx and the like in the exhaust gas, and an air-fuel ratio sensor 24 is provided on the upstream of the catalyst 23 to detect the air-fuel ratio (or oxygen concentration) in the exhaust gas. Further, the cylinder block of the engine 11 is provided with a cooling water temperature sensor 25 for detecting the cooling water temperature and a crank angle sensor 26 that produces a pulse signal every time when the crankshaft of the engine 11 revolves a predetermined crank angle. The crank angle and the engine rotational speed are detected based on the output signals of the crank angle sensor 26.

The outputs of the sensors are input to an engine control circuit (hereinafter referred to as ECU) 27. The ECU 27 is chiefly constituted by a microcomputer, and executes various engine control programs stored in a ROM (storage medium) incorporated therein to calculate an air-fuel ratio feedback correction coefficient such that the air-fuel ratio of the exhaust gas detected by the air-fuel ratio sensor 24 is brought into agreement with a target air-fuel ratio thereby to correct the amount of the fuel fed to the engine 11 (amount of injecting the fuel) by feedback. The air-fuel ratio feedback control system is designed by modeling the response characteristics according to which the air-fuel ratio of the exhaust gas varies following a change in the amount of feeding the fuel which is the object to be controlled after the dead time+1st-order delay characteristics. The response characteristics may be modeled after the dead time+2nd-order delay characteristics. In effect, the response characteristics may be modeled after the dead time+n-order delay characteristics (n is a positive integer).

Further, the ECU 27 executes the routines illustrated in FIGS. 4 to 6 that will be described later and detects the response characteristics of the air-fuel ratio sensor 24 in a manner of being divided into the dead time and the 1st-order delay characteristics (n-order delay characteristics) by varying the amount of feeding the fuel by step inputting during the steady operation in which the engine 11 is steadily running near the target air-fuel ratio.

Figure 2:
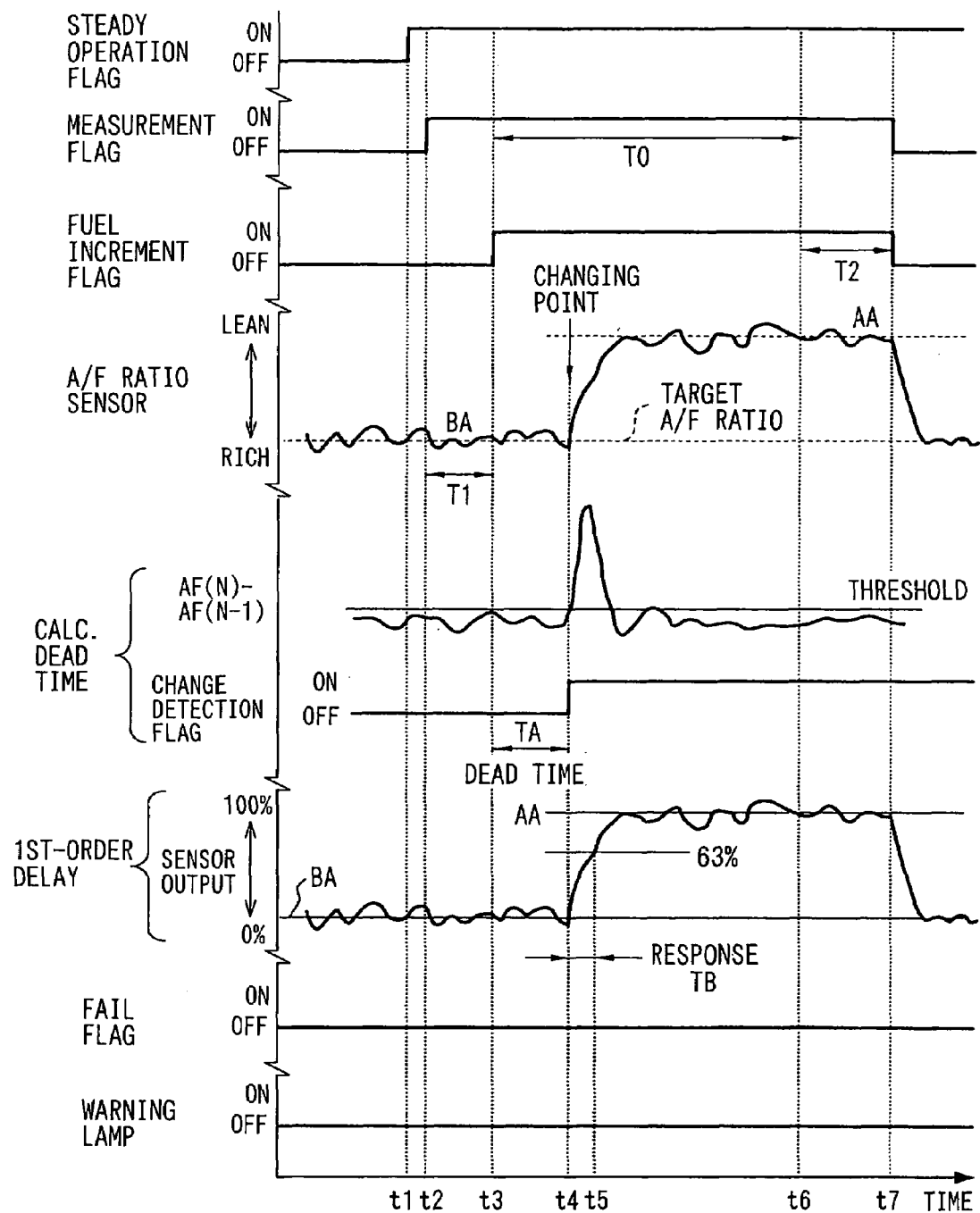
FIG. 2 is a time chart illustrating a method of detecting response characteristics according to the embodiment 1.
Figure 3:
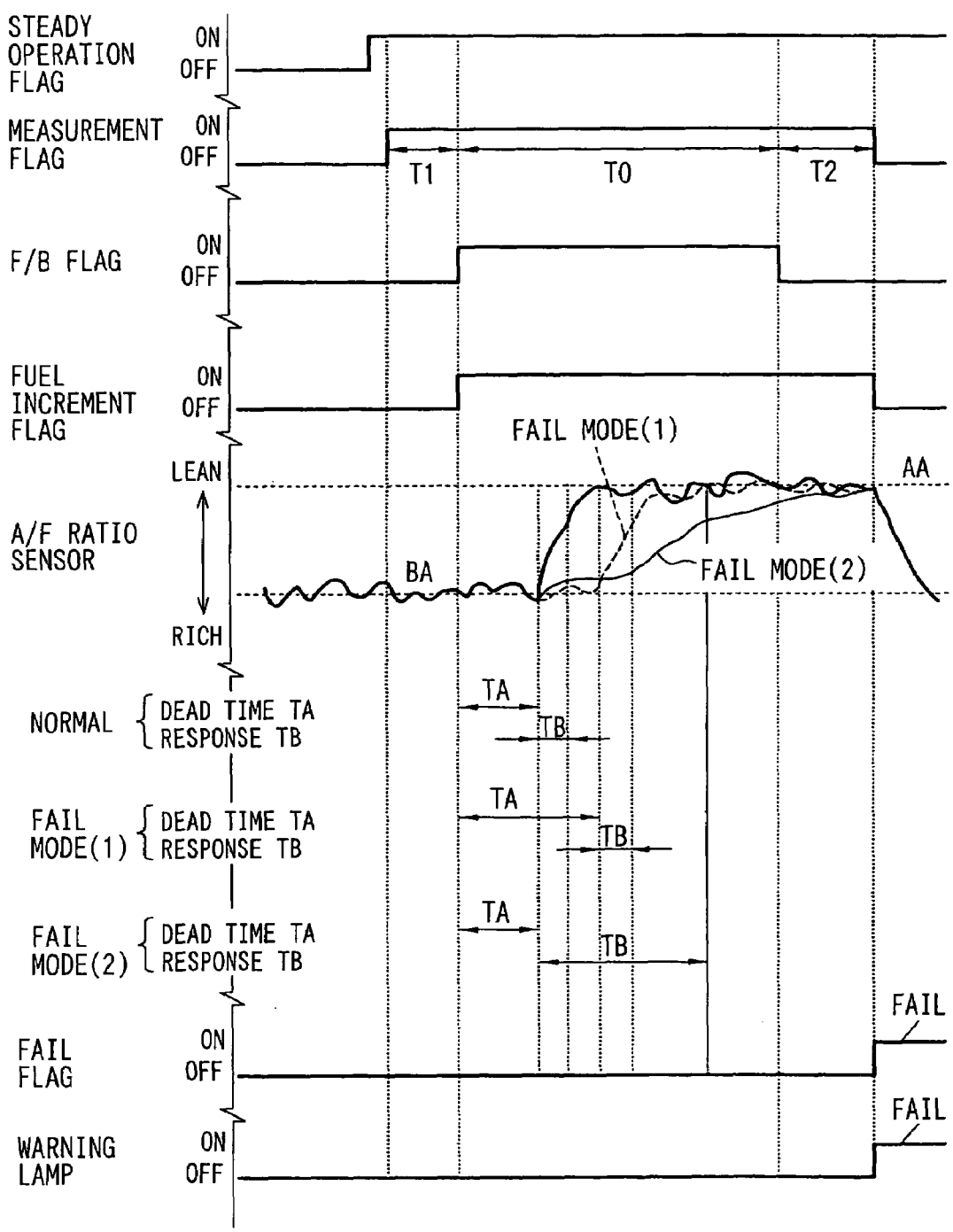
FIG. 3 is a time chart illustrating a method of diagnosing a fail condition in the air-fuel ratio sensor according to the embodiment 1.

A method of detecting the response characteristics of the air-fuel ratio sensor 24 will now be described with reference to time charts of FIGS. 2 and 3. In the time chart of FIG. 2, the ECU 27 determines at a moment t1 that the engine is operating in a steady state and turns a steady operation flag ON, determines at a moment t2 that a response characteristics detection execution condition is holding and turns a measurement processing flag ON to start the processing for measuring the response characteristics. Here, the response characteristics detection execution condition is such that the output of the air-fuel ratio sensor 24 (hereinafter simply referred to as sensor output) in the steady operation state is stable near the target air-fuel ratio and a change in the sensor output is small. In a state where the sensor output is not stable, it is not possible to precisely detect the response characteristics of the air-fuel ratio sensor 24.

In a period (t2 to t3) until a predetermined time T1 elapses from the moment t2 of starting the measurement of response characteristics, an average value of the sensor output is calculated by the profile processing or by the averaging processing such as averaging of addition while maintaining the steadily operating state by continuing the air-fuel ratio feedback control. The average value of the sensor output is stored in the memory of the ECU 27 as "a steady value BA of the sensor output of before increasing the amount of the fuel". When the steady value BA of the sensor output is very stable at the moment t2 of starting the measurement of response characteristics, the sensor output sampled at the moment t2 of starting the measurement of response characteristics may be directly used as the steady value BA of the sensor output of before increasing the amount of the fuel.

At a moment t3 of discontinuing the measurement of the steady value BA of the sensor output of before increasing the amount of the fuel, the air-fuel ratio feedback control is discontinued, the fuel increment flag is turned ON, the amount of feeding the fuel (amount of injecting the fuel) is increased instep inputting, and the measurement of the dead time TA starts. Thereafter, a point where a gradient of change in the sensor output exceeds a threshold value is detected as a point of start of change.

The gradient of change in the sensor output can be calculated by a variety of methods. Here, the embodiment 1 uses a difference [AF (N)–AF (N–1)] between the present sensor output AF (N) and the sensor output AF (N–1) of the last time as a gradient of change in the sensor output. A difference [AF (N)–AF (N–S)] between the present sensor output AF (N) and the sensor output AF (N–1) of S times before may be used as a gradient of change in the sensor output.

A point at where the gradient of change [AF (N)–AF (N–1)] in the sensor output has exceeded the threshold value first may be detected as a point of start of change. In the embodiment 1, however, the point of start of change is successively detected until the gradient of change in the sensor output exceeds the threshold value a predetermined number of times in order to prevent in advance the erroneous detection of a point of start of change caused by noise or the like.

In this case, the threshold value may be a fixed value which has been set in advance for simplifying the arithmetic processing. In the embodiment 1, however, the threshold value is set by using, for example, a map of FIG. 9 based on the operation parameters (e.g., engine rotational speed and air-fuel ratio) that affect the noise superposed on the sensor output. This makes it possible to set a proper threshold value that meets the intensity of the real noise and, hence, to more correctly detect a point of start of change while preventing erroneous detection caused by noise and the like.

The point of start of change may be a response point of a predetermined ratio (e.g., a 10% response point).

After the point of start of change is detected as described above, a time from the timing t3 of increasing the amount of the fuel to a point t4 of start of change is detected as a dead time TA. A point of start of change detection flag is turned ON at the moment t4 of detecting the point of start of change to start the processing for measuring the 1st-order delay characteristics.

After the start of the processing for measuring the 1st-order delay characteristics, a response time TB is calculated until a change in the sensor output varies from the steady value BA of the sensor output of before increasing the amount of the fuel to a predetermined ratio (e.g., 63%) of the amount of change (AA–BA) of up to a steady value AA of the sensor output after the amount of the fuel has been increased during the period of before a predetermined time T0 elapses from the timing t3 of increasing the amount of the fuel. The response time TB is used as information for evaluating the 1st-order delay characteristics.

Here, the steady value AA of the sensor output of after the amount of the fuel has been increased may be a value that is learned for every operation region. In the embodiment 1, however, the air-fuel ratio feedback control is resumed at a moment t6 after the predetermined time T0 has elapsed from the timing t3 of increasing the amount of the fuel, and the target air-fuel ratio is deviated toward the rich side by the amount of increasing the fuel until a predetermined time T2 elapses to correct the amount of feeding the fuel by feedback, so that the sensor output is stabilized near the target air-fuel ratio (steady value AA). The average value of the sensor output of this period (t6 to t7) is calculated by the profile processing or by the averaging processing such as averaging the addition, and is used as "a steady value AA of the sensor output after the amount of the fuel has been increased". When the sensor output has been fully stabilized as the steady value AA at a moment t6 which is after the passage of the predetermined time T0 from the timing t3 of increasing the amount of the fuel, the sensor output at the moment t6 after the passage of the predetermined period T0 may be used as the steady value AA of the sensor output after the amount of the fuel has been increased.

At a moment t7 of discontinuing the measurement of the steady value AA of the sensor output after the amount of the fuel has been increased, the measurement processing flag is turned OFF to end the processing for measuring the response characteristics. When the steady value AA of the sensor output after having increased the amount of the fuel has been known in advance due to learning, a measurement processing flag may be turned OFF at a moment when the sensor output has reached the steady value AA to end the processing for measuring the response characteristics.

After the end of the processing for measuring the response characteristics, the target air-fuel ratio is changed over to a target air-fuel ratio of during the normal operation to execute the air-fuel ratio feedback control. In the embodiment 1, the air-fuel ratio is varied toward the rich side by increasing the amount of feeding the fuel for detecting the response characteristics. Contrary to this, however, the amount of feeding the fuel may be decreased to vary the air-fuel ratio toward the lean side. Or, the amount of feeding the fuel is decreased (or increased) by step inputting at the start of measuring the response characteristics to shift the air-fuel ratio toward the lean side (or the rich side) to calculate the steady value BA of the sensor output. Thereafter, the amount of feeding the fuel is increased (or decreased) by step inputting to shift the air-fuel ratio toward the rich side (or lean side) to calculate the steady value AA of the sensor output. The response time TB is calculated in which a change in the sensor output from the steady value BA of the sensor output of before increasing the amount of the fuel (or before decreasing the amount of fuel) reaches a predetermined ratio (e.g., 63%) of the change (AA–BA) of up to the steady value AA in the sensor output of after the amount of the fuel has been increased (or of after the amount of the fuel has been decreased).

Further, the ECU 27 executes a routine for diagnosing an fail condition in the air-fuel ratio sensor illustrated in FIG. 7 that will be described later, and determines the presence of an fail condition in the air-fuel ratio sensor 24 based on the results of detecting the response characteristics (dead time TA and the response time TB) of the air-fuel ratio sensor 24. Referring to FIG. 3, a relationship between the dead time TA and the response time TB (1st-order delay characteristics) differs depending upon a fail mode of the air-fuel ratio sensor 24. In, for example, a given fail mode (1), the dead time TA only becomes abnormally long while the response time TB does not much change from that of under the normal condition. In another fail mode (2), however, the dead time TA does not much change from that of under the normal condition but the response time TB only becomes abnormally long. In the embodiment 1, therefore, the air-fuel ratio sensor 24 is determined to be failed if any one of the following three conditions (a) to (c) applies.

(a) The dead time TA lies outside the allowable range.
(b) The response time TB lies outside the allowable range.
(c) The total time (TA+TB) of the dead time TA and the response time TB lies outside the allowable range.

When an fail condition in the air-fuel ratio sensor 24 is detected, the ECU 27 turns on or flashes the warning lamp 32 (warning means) or displays warning on a display unit (not shown) on an instrument panel at the driver's seat to warning the driver.

Described below are the contents of processings of routines of FIGS. 4 to 8 executed by the ECU 27.

[Main Routine for Detecting Response Characteristics of the Air-Fuel Ratio Sensor]

Figure 4:
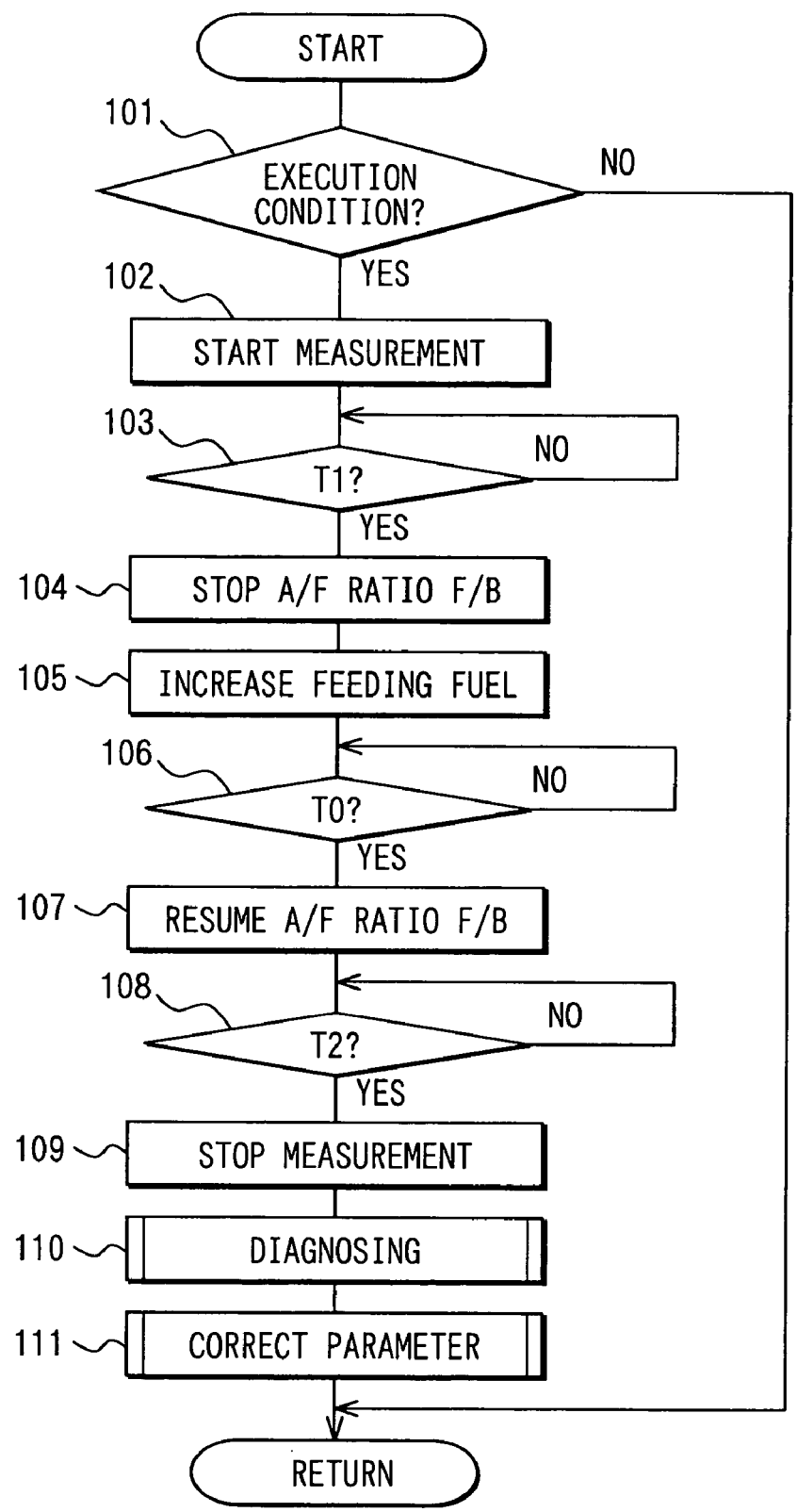
FIG. 4 is a flowchart illustrating the flow of a processing of a main routine for detecting the response characteristics of the air-fuel ratio sensor according to the embodiment 1.

A main routine for detecting the response characteristics of the air-fuel ratio sensor of FIG. 4 is periodically executed while the engine is in operation and plays the role of step response characteristics detecting means referred to in claims. When the routine starts, it is first determined at step 101 if a response characteristics detection execution condition is holding (if the measurement processing flag is ON). Here, the response characteristics detection execution condition is such that the engine is in a steadily operating condition (steady operation flag is ON) and the output of the air-fuel ratio sensor 24 (sensor output) remains stable near the target air-fuel ratio. When the sensor output is not stable, the response characteristics of the air-fuel ratio sensor 24 cannot be precisely detected.

If it is determined at step 101 that the response characteristics detection execution condition is not holding, the routine ends without executing the subsequent processings. If it is determined that the response characteristics detection execution condition is holding, the response characteristics detection processing is executed in a manner as described below. At step 102, first, measurement of the response characteristics starts and the routine stands by until a predetermined time T1 elapses (step 103). After starting the measurement of response characteristics, time series data of sensor output from which the steady value BA of the sensor output of before increasing the amount of the fuel is calculated, are stored in the memory in the ECU 27. Thereafter, during the period of from the start of measuring the response characteristics until the predetermined time T1 elapses, the steady value BA (average value) of the sensor output of before increasing the amount of the fuel is calculated by the profile processing or by the averaging processing such as averaging the addition while continuing the air-fuel ratio feedback control to maintain the steady operating condition.

At a moment when the predetermined time T1 has elapsed after starting the measurement of response characteristics, the routine proceeds to step 104 where the air-fuel ratio feedback control is discontinued, the fuel increment flag is turned ON and at next step 105, the amount of feeding the fuel (amount of injecting the fuel) is increased by step inputting. Thereafter, the routine proceeds to step 106 and stands by until a predetermined time T0 elapses from the timing of increasing the amount of the fuel. Here, the predetermined time T0 is set to be a time necessary until the sensor output is stabilized at the steady value AA after the amount of the fuel has been increased. The time series data of the sensor output from which the response time TB is calculated are stored in the memory in the ECU 27 during the period until the predetermined time T0 elapses from the start of increasing the amount of the fuel.

After the passage of the predetermined time T0 from the start of increasing the amount of the fuel, the routine proceeds to step 107 to resume the air-fuel ratio feedback control. The amount of feeding the fuel is corrected by feedback by shifting the target air-fuel ratio toward the rich side by the amount the fuel is increased until the predetermined time T2 elapses (step 108), so that the sensor output is stabilized near the target air-fuel ratio (steady value AA). The average value of the sensor output of this period is calculated by the profile processing or by the averaging processing such as averaging the addition, and the averaged value is used as "a constant value AA of the sensor after the having increased the amount of the fuel".

At a moment when the predetermined time T2 has elapsed, the routine proceeds to step 109 where measurement of the response characteristics ends and the target air-fuel ratio is changed over to a target air-fuel ratio of during the normal operation to execute the air-fuel ratio feedback control.

Thereafter, the routine proceeds to step 110 to execute a routine for diagnosing an fail condition in the air-fuel ratio sensor illustrated in FIG. 7 that will be described later, and determines the presence of an fail condition in the air-fuel ratio sensor 24 based on the dead time TA and the response time TB. The routine further proceeds to step 111 to execute a routine for correcting the air-fuel ratio feedback control parameter of FIG. 8 that will be described later, and corrects the parameter when it is determined that the air-fuel ratio feedback control parameter needs be corrected based upon the dead time TA and the response time TB.

[Routine for Calculating the Dead Time]

Figure 5:
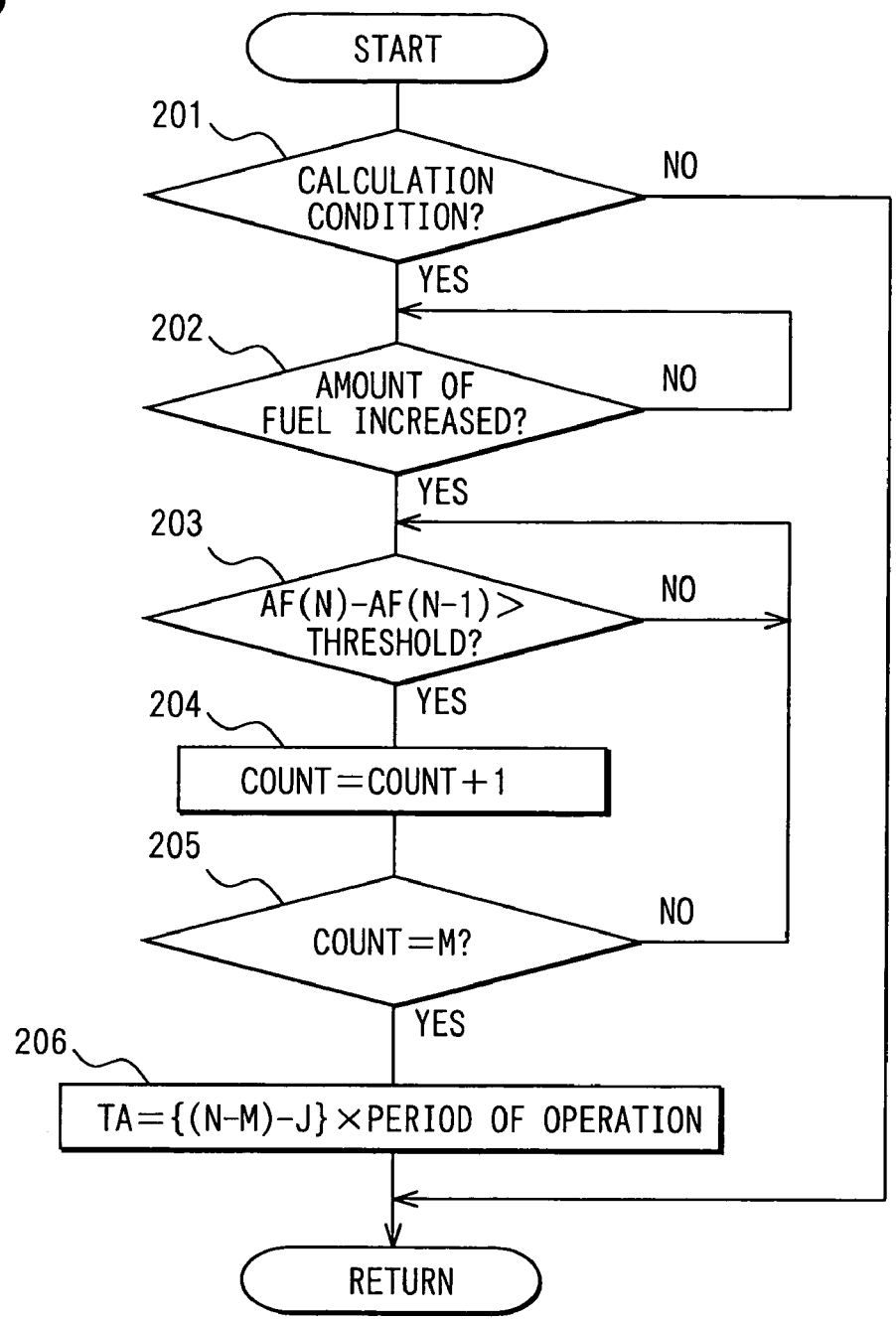
FIG. 5 is a flowchart illustrating the flow of a processing of a routine for calculating a dead time according to the embodiment 1.

A routine for calculating the dead time of FIG. 5 is periodically executed while the engine is in operation and plays the role of step response characteristics detecting means referred to in claims. When the routine starts, it is first determined at step 201 if the dead time calculation condition is holding. The dead time calculation condition is such that (1) the measurement processing flag is ON (response characteristics are being measured), and (2) the dead time TA has not been calculated yet. If either one of these two conditions (1) and (2) is not satisfied, the dead time calculation condition does not hold, and the routine ends without executing the subsequent processing.

On the other hand, if the above two conditions (1) and (2) are simultaneously satisfied, the dead time calculation condition holds, and the routine proceeds to step 202 and stands by until the amount of feeding the fuel increases. The processing of step 202 plays the role of fuel changing timing determining means referred to in claims.

Thereafter, at a moment when the amount of feeding the fuel is increased, the routine proceeds to step 203 where the gradient of change [AF (N)–AF (N–1)] in the present sensor output is compared with a threshold value and the routine stands by until the gradient of change [AF (N)–AF (N–1)] in the sensor output exceeds the threshold value.

A moment when the gradient of change [AF (N)–AF (N–1)] in the sensor output has exceeded the threshold value is determined to be a point of start of change and the routine proceeds to step 204 to count up the counter Count that detects the point of start of change. The routine further proceeds to step 205 where it is determined if the counted value of the counter Count that detects the point of start of change has reached a predetermined value M. If the counted value is not reaching the predetermined value M, the routine returns back to step 203 to repeat the above processings. Therefore, the detection of the point of start of change continues until the gradient of change [AF (N)–AF (N–1)] in the sensor output exceeds the threshold value a predetermined number of times (M times).

At a moment when the counted value of the counter Count for detecting the point of start of change has reached a predetermined value M after the gradient of change [AF (N)–AF (N–1)] in the sensor output has exceeded the threshold value a predetermined number of times (M times), the routine proceeds to step 206, and the dead time TA from the timing (j) of increasing the amount of the fuel until the point of start of change (N–M) is calculated according to the following formula, $$TA = \{(N-M)-J\} \times \text{period of operation}$$

where (N–M) is a cumulative number of times of operation of the point of start of change that is a point at which the gradient of change [AF(N)–AF(N–1)] in the sensor output has exceeded the threshold value first, an J is a cumulative number of times of operation of the timing at which the amount of the fuel is increased.

[Routine for Calculating the 1st-Order Delay Characteristics]

Figure 6:
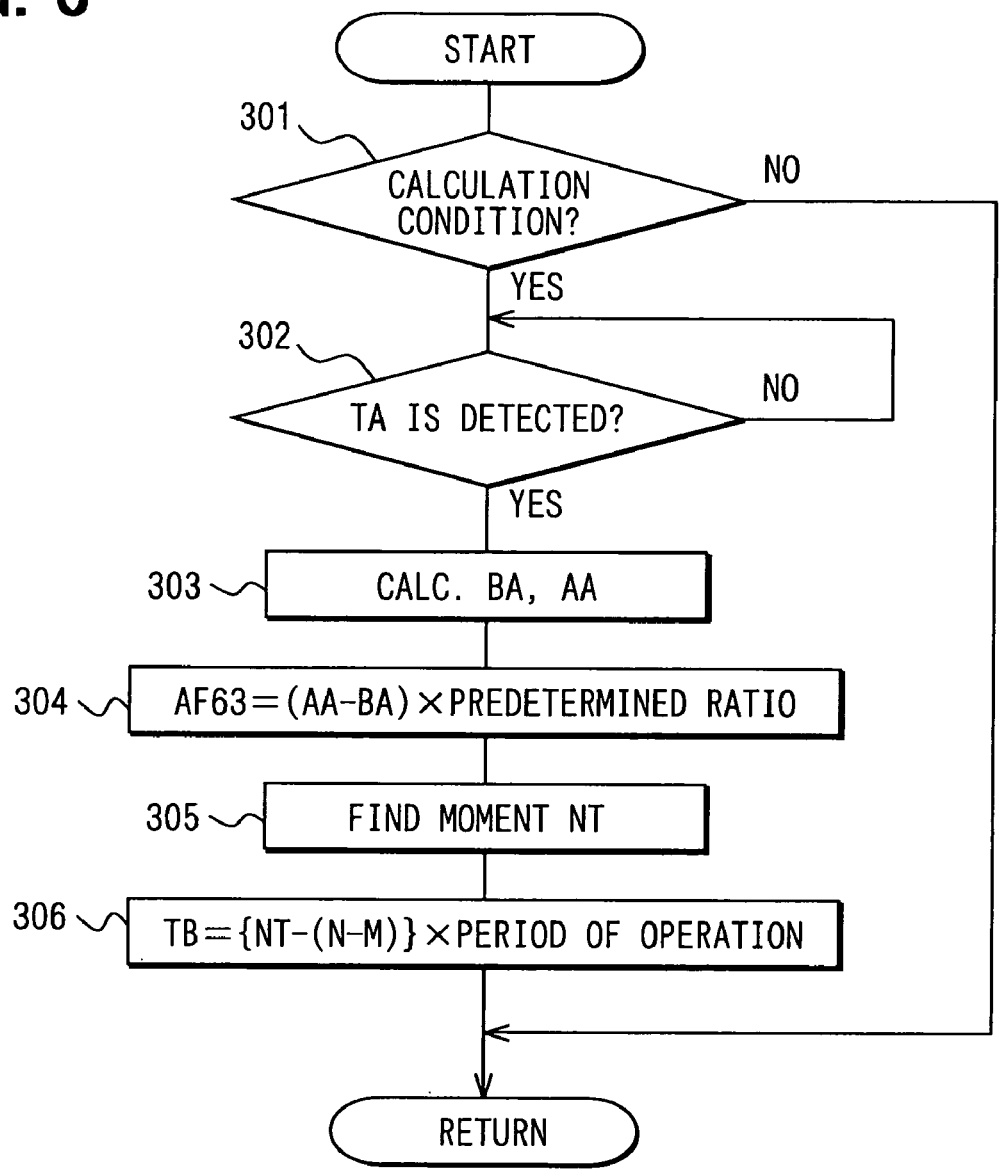
FIG. 6 is a flowchart illustrating the flow of a processing of a routine for calculating the 1st-order delay characteristics according to the embodiment 1.

A routine for calculating the 1st-order delay characteristics of FIG. 6 is periodically executed while the engine is in operation and plays the role of step response characteristics detecting means referred to in claims. When the routine starts, it is first determined at step 301 if the response time calculation condition is holding. The response time calculation condition is such that (1) the measurement processing flag is OFF (measurement of response characteristics has been finished), and (2) the response time TB has not been calculated yet. If either one of these two conditions (1) and (2) is not satisfied, the response time calculation condition does not hold, and the routine ends without executing the subsequent processing.

On the other hand, if the above two conditions (1) and (2) are simultaneously satisfied, the response time calculation condition holds, and the routine proceeds to step 302 and stands by until the dead time TA is detected. At a moment when the dead time TA is detected, the routine proceeds to step 303 where the steady value BA of the sensor output of before the amount of the fuel is increased and the steady value AA of the sensor output of after the amount of the fuel is increased are calculated based on the time series data of the sensor output stored in the memory in the ECU 27. Here, the steady value BA of the sensor output of before the amount of the fuel is increased is an average value of the sensor output until the predetermined time T1 elapses from the start of the measurement processing, and the steady value AA of the sensor output after the amount of the fuel is increased is an average value of the sensor output in the predetermined time T2 before the end of the measurement.

Thereafter, the routine proceeds to step 304 where a sensor output AF63 corresponding to a predetermined ratio (e.g., 63%) of the change (AA–BA) of from the steady value BA of before the amount of the fuel is increased up to the steady value AA of after the amount of the fuel is increased, is calculated according to the following formula, $$AF63 = (AA-BA) \times \text{predetermined ratio}$$

Thereafter, the routine proceeds to step 305 to retrieve the time series data of the sensor output stored in the memory in the ECU 27 to find a moment NT at which the sensor output has reached AF63. The routine further proceeds to step 306 to calculate the response time TB from the point of start of change (N–M) until the moment NT at which the sensor output has reached AF63 according to the following formula, $$TB = \{NT-(N-M)\} \times \text{period of operation}$$

In this routine, the steady value BA and steady value AA in the sensor outputs before and after the amount of the fuel is increased are calculated based on the time series data of the sensor output stored in the memory in the ECU 27 after the end of the measurement of the response characteristics (when the measurement processing flag is turned OFF). However, when the steady values BA and M of the sensor outputs before and after the amount of the fuel is increased have been learned in advance at the start of the measurement of response characteristics (when the measurement processing flag is turned ON), AF63=(AA–BA)× predetermined ratio may be calculated during the measurement of the response characteristics prior to detecting the point of start of change (dead time TA). After the point of start of change (dead time TA) is detected, the sensor output may be compared with AF63 for every sampling of the sensor output to detect the moment NT at which the sensor output has reached AF63 in real time.

It is further allowable to detect the response time of the 2nd-order delay or the response time of the tertiary or higher order delay instead of detecting the response time of the 1st-order delay. It is further allowable to calculate a coefficient of a transfer function of the n-order delay instead of detecting the response time.

[Routine for Diagnosing a Fail Condition in the Air-Fuel Ratio Sensor]

Figure 7:
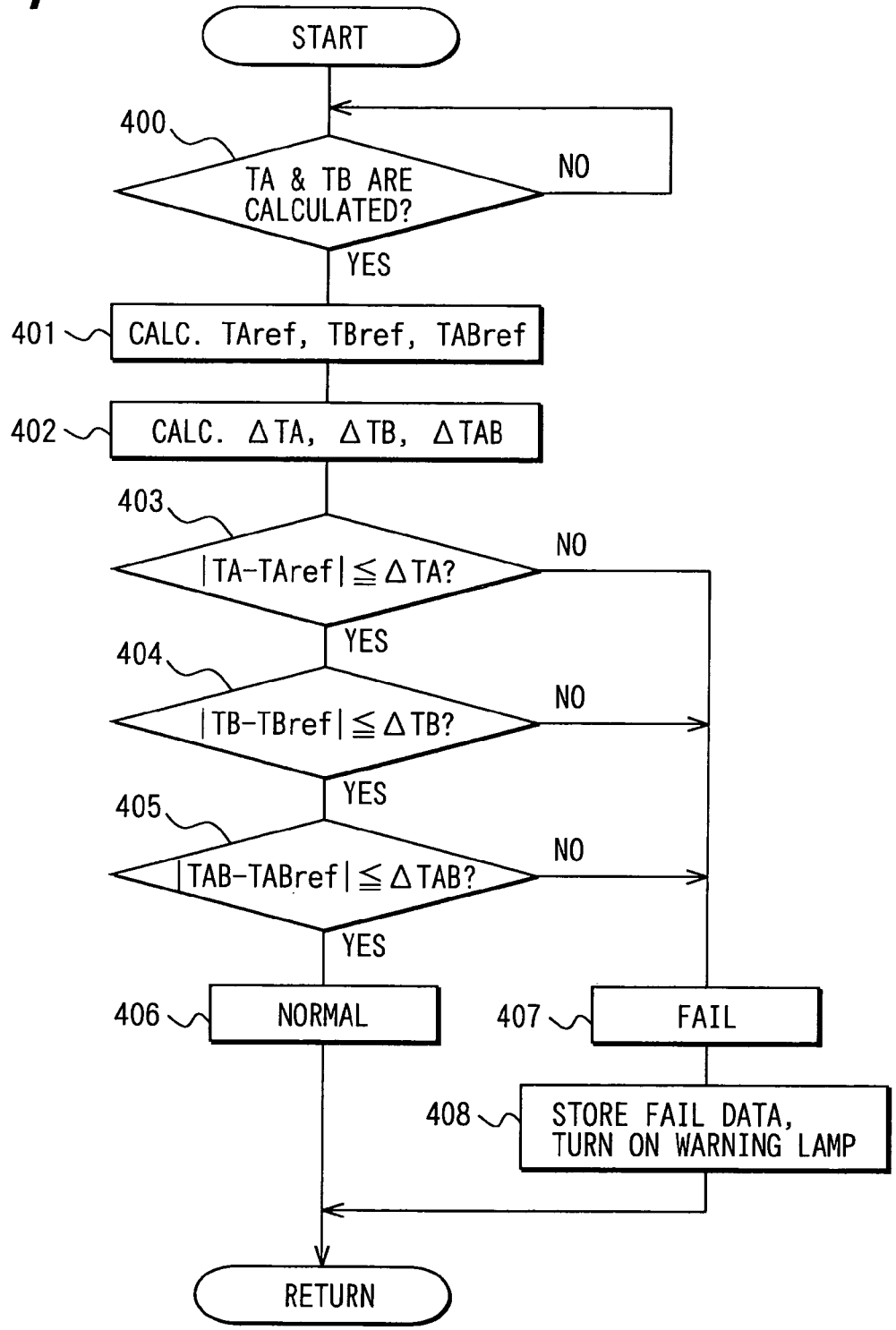
FIG. 7 is a flowchart illustrating the flow of a processing of a routine for diagnosing a fail condition in the air-fuel ratio sensor according to the embodiment 1.

A routine for diagnosing an fail condition in the air-fuel ratio sensor of FIG. 7 is a subroutine executed at step 110 of the main routine for detecting the air-fuel ratio sensor response characteristics of FIG. 4, and plays the role of fail condition determining means referred to in claims. Upon being started, the routine stands by at step 400 until the dead time TA and the response time TB are calculated by the routines of FIGS. 5 and 6. After the dead time TA and the response time TB are calculated, the routine proceeds to step 401 where a standard dead time TAref, a standard response time TBref and a standard detection time TABref are calculated by using maps depending upon the present engine operating conditions. Here, the standard dead time TAref is a standard dead time TA, the standard response time TBref is a standard response time TB, and the standard detection time TABref is a standard value of the total time (=detection time TAB) of the dead time TA and the response time TB.

Thereafter, the routine proceeds to step 402 where permissible errors ΔTA, ΔTB and ΔTAB for the dead time TA, response time TB and detection time TAB are calculated by using maps depending upon the present engine operating conditions.

At next step 403, it is determined if a difference between the dead time TA and the standard dead time TAref is smaller than the permissible error ΔTA. If the difference between the dead time TA and the standard dead time TAref is greater than the permissible error ΔTA, the routine proceeds to step 407 to determine that the air-fuel ratio sensor 24 is failed.

If it is determined at step 403 that a difference between the dead time TA and the standard dead time TAref is smaller than the permissible error ΔTA, the routine proceeds to step 404 where it is determined if a difference between the response time TB and the standard response time TBref is smaller than the permissible error ΔTB. If the difference between the response time TB and the standard response time TBref is greater than the permissible error ΔTB, the routine proceeds to step 407 to determine that the air-fuel ratio sensor 24 is failed.

If it is determined at step 404 that a difference between the response time TB and the standard response time TBref is smaller than the permissible error ΔTB, the routine proceeds to step 405 where it is determined if a difference between the detection time TAB and the standard detection time TABref is smaller than the permissible error ΔTAB. Here, there has been set a relationship ΔTAB<ΔTA+ΔTB. If it is determined at step 405 that a difference between the detection time TAB and the standard detection time TABref is greater than the permissible error ΔTAB, the routine proceeds to step 407 where it is determined that the air-fuel ratio sensor 24 is failed.

When the fail condition in the air-fuel ratio sensor 24 is detected as described above, the routine proceeds to step 408 where fail data is stored in a rewritable nonvolatile memory (not shown) such as a backup RAM in the ECU 27, and a warning lamp 32 is turned on or flashed and a warning is displayed on a display unit (not shown) on the instrument panel at the driver's seat to warn the driver.

When the determination is all "YES" at steps 403 to 405, on the other hand, the routine proceeds to step 406 to determine that the air-fuel ratio sensor 24 is normal.

Here, the air-fuel ratio sensor 24 may be determined to be failed in case the processing time exceeds a normal range during the processing for measuring the dead time or the response time. This makes it possible to discontinue the measurement at a moment when it is determined that the dead time is becoming abnormally long or the response time is becoming abnormally long during the processing of measurement, and to readily determine that the air-fuel ratio sensor 24 is becoming fail, offering advantages in that the fail condition can be detected at an early time in case an fail condition occurs in the air-fuel ratio sensor 24 and that the processing time for measurement is prevented from becoming abnormally long.

[Routine for Correcting an Air-Fuel Ratio Feedback Control Parameter]

Figure 8:
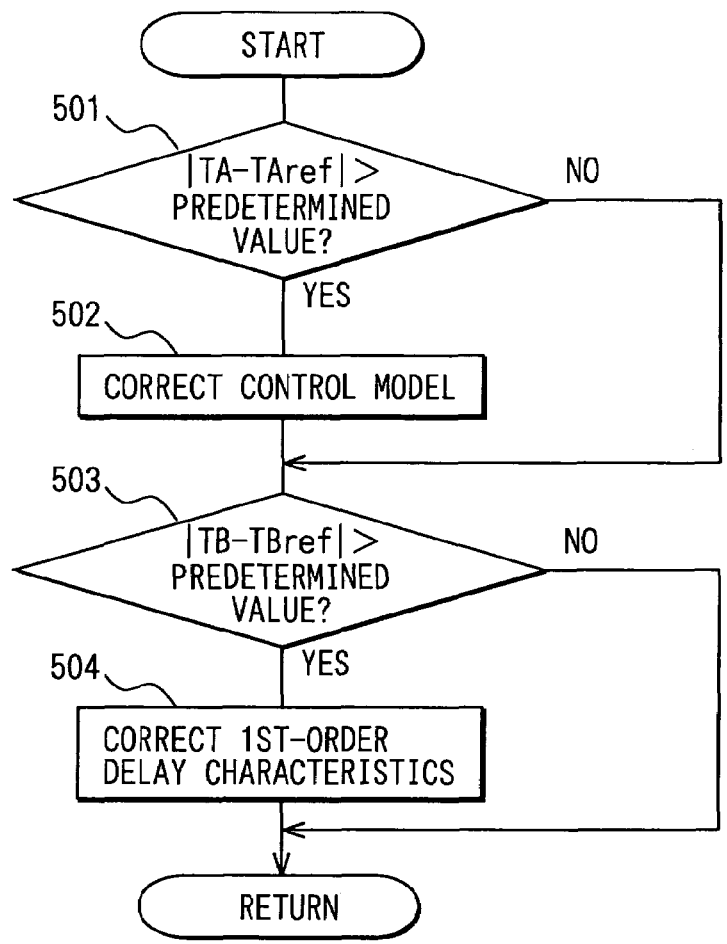
FIG. 8 is a flowchart illustrating the flow of a processing of a routine for correcting an air-fuel ratio feedback control parameter according to the embodiment 1.
Figure 9:
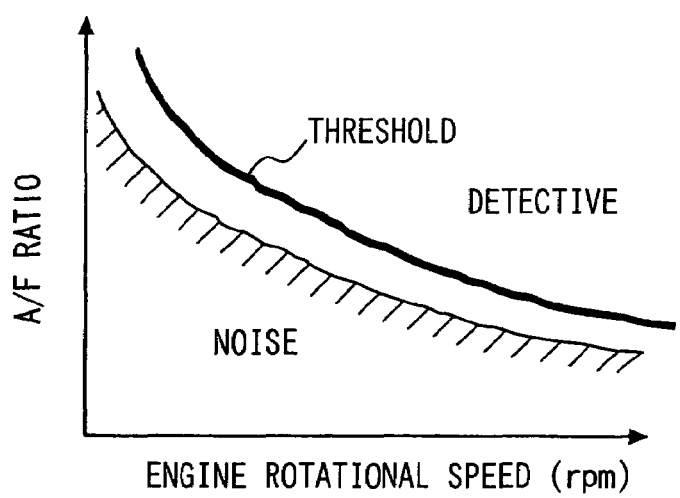
FIG. 9 is a diagram illustrating a map for calculating threshold values according to the embodiment 1.

A routine for correcting an air-fuel ratio feedback control parameter of FIG. 8 is a subroutine executed at step 111 of the main routine for detecting the air-fuel ratio sensor response characteristics of FIG. 4. When the routine starts, it is determined at step 501, first, if a difference between the dead time TA and the standard dead time TAref is greater than a predetermined value. If the difference between the dead time TA and the standard dead time TAref is greater than the predetermined value, the routine proceeds to step 502 where the dead time of the control model is corrected (varied or compensated) and the routine proceeds to step 503. On the other hand, if the difference between the dead time TA and the standard dead time TAref is smaller than the predetermined value, the routine proceeds to step 503 without correcting the dead time of the control model.

At step 503, it is determined if a difference between the response time TB and the standard response time TBref is greater than a predetermined value. If the difference between the response time TB and the standard response time TBref is greater than the predetermined value, the routine proceeds to step 504 where the 1st-order delay characteristics (or control gain) of the control model are corrected. If the difference between the response time TB and the standard response time TBref is smaller than the predetermined value, on the other hand, the routine ends without correcting the 1st-order delay characteristics (or control gain) of the control model.

In the embodiment 1 described above, the behavior of the output of the air-fuel ratio sensor 24 before and after the amount of the fuel is increased is monitored, and the response characteristics of the air-fuel ratio sensor 24 are detected in a manner of being divided into the dead time from the timing of increasing the amount of the fuel until the sensor output starts varying and the subsequent 1st-order delay characteristics (response time) representing a change in the sensor output. It is therefore made possible to detect the response characteristics (dead time and the 1st-order delay characteristics) on which the design of the air-fuel ratio feedback control system is based and, hence, to precisely detect the deterioration in the air-fuel ratio feedback controllability caused by the deteriorated response characteristics of the air-fuel ratio sensor 24 or caused by the faulty air-fuel ratio sensor 24.

Besides, in the embodiment 1, the amount of feeding the fuel is increased by step inputting when the engine 11 is steady operating near the target air-fuel ratio to detect the response characteristics making it possible to precisely detect the response characteristics in an air-fuel ratio region that has heretofore been controlled by the air-fuel ratio feedback control system. Further, since the response characteristics are detected for the stepwise change in the amount of feeding the fuel, it is allowed to easily detect the response characteristics compared to when the amount of the fuel is changed in a manner other than the stepwise change, preventing such an occurrence that the load processed by the ECU 27 becomes excessively great or the memory capacity becomes insufficient.

In the embodiment 1, further, the fail condition in the air-fuel ratio sensor 24 is diagnosed based on the dead time and the 1st-order delay characteristics (response time) that are detected. This makes it possible to detect even a fail mode that could not be detected so far and to improve the precision for diagnosing a fail condition in the air-fuel ratio sensor 24.

In the embodiment 1, further, the air-fuel ratio feedback control parameter is varied or corrected based on the dead time and the 1st-order delay characteristics (response time) that are detected making it possible to properly correct the air-fuel ratio feedback control parameter depending upon a change in the response characteristics (dead time and 1st-order delay characteristics) in the air-fuel ratio feedback control system and to improve the precision for controlling the air-fuel ratio.

Embodiment 2

In the above embodiment 1, the response characteristics of the air-fuel ratio sensor 24 are detected by shifting the air-fuel ratio stepwise toward the rich side (or the lean side) by increasing (or decreasing) the amount of feeding the fuel by step inputting during the steady operation of the engine 11. In the embodiment 2 of the invention, however, the response characteristics (dead time TA and the response time TB) of the air-fuel ratio sensor 24 are detected by utilizing a change in the amount of feeding the fuel when the target air-fuel ratio is changed over to the rich side or the lean side and the amount of feeding the fuel is varied (increased or decreased) during the steady operation of the engine 11.

Figure 10:
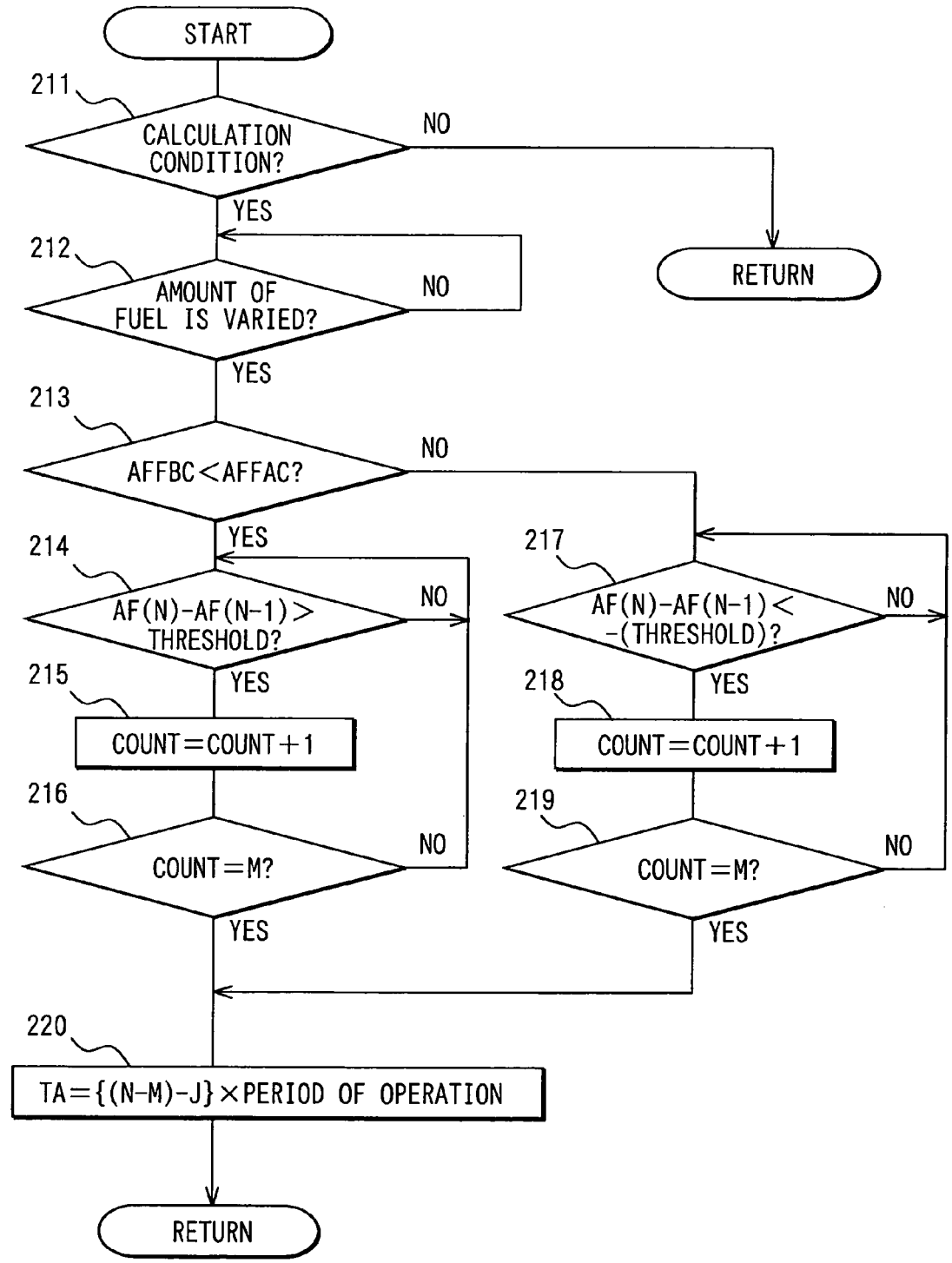
FIG. 10 is a flowchart illustrating the flow of a processing of a routine for calculating the dead time according to an embodiment 2.

In this embodiment 2, a routine for calculating the dead time of FIG. 10 is periodically executed while the engine is in operation to calculate the dead time in a manner as described below. When the routine starts, it is determined at step 211, first, if the dead time calculation condition is holding. The dead time calculation condition is such that (1) a measurement processing flag is ON (response characteristics are being measured) and (2) the dead time TA has not been calculated yet. If either one of these two conditions (1) and (2) is not satisfied, the dead time calculation condition does not hold, and the main routine ends without executing the subsequent processing.

If the above two conditions (1) and (2) are simultaneously satisfied, there holds the dead time calculation condition, and the routine proceeds to step 212 and stands by until the amount of feeding the fuel is varied. The processing at step 212 plays the role of fuel changing timing determining means referred to in claims.

Thereafter, at a moment when the amount of feeding the fuel is changed, the routine proceeds to step 213 where it is judged if a change in the amount of feeding the fuel is the one toward the increasing side (amount of feeding the fuel before the change AFFBC<amount of feeding the fuel after the change AFFAC). If the change in the amount of feeding the fuel is the one toward the increasing side, the point of start of change is successively detected through the processings of steps 214 to 216 until the rising gradient of the sensor output [AF (N)–AF (N–1)] exceeds the threshold value a predetermined number of times (M times).

Thereafter, at a moment when the rising gradient [AF (N)–AF (N–1)] of the sensor output has exceeded the threshold value the predetermined number of times (M times) and the counted value of the counter Count for detecting the point of start of change has reached the predetermined value M, the routine proceeds to step 220 to calculate the dead time TA from the timing (j) of changing the amount of feeding the fuel until the point of start of change (N–M) according to the following formula, $$TA = \{(N-M)-J\} \times \text{period of operation}$$

On the other hand, when it is determined at step 213 that a change in the amount of feeding the fuel is the one toward the decreasing side (amount of feeding the fuel before the change>amount of feeding the fuel after the change), the point of start of change is successively detected through the processings of steps 217 to 219 until the breaking gradient of the sensor output [AF (N)–AF (N–1)] exceeds the negative threshold value a predetermined number of times (M times).

Thereafter, at a moment when the breaking gradient [AF (N)–AF (N–1)] of the sensor output has exceeded the negative threshold value the predetermined number of times (M times) and the counted value of the counter Count for detecting the point of start of change has reached the predetermined value M, the routine proceeds to step 220 to calculate the dead time TA from the timing (j) of changing the amount of feeding the fuel until the point of start of change (N–M) according to the above formula.

In this embodiment 2, too, the response time TB may be calculated by using the routine for calculating the 1st-order delay characteristics of FIG. 6 described in the above embodiment 1.

Embodiment 3

In the above embodiments 1, 2, the point where the gradient of change in the sensor output exceeds the threshold value after the amount of feeding the fuel has been changed is detected as a point of start of change. It is, however, also allowable to detect response times of a number of not less than n+1 to estimate an approximation (transfer function) of a curve of a change in the sensor output of the n-order delay, to estimate the point of start of change based on the curve of change in the sensor output and on the sensor output (steady value BA) in the steady state of before the amount of feeding the fuel is changed, thereby to calculate the dead time by using the point of start of change.

Figure 11:
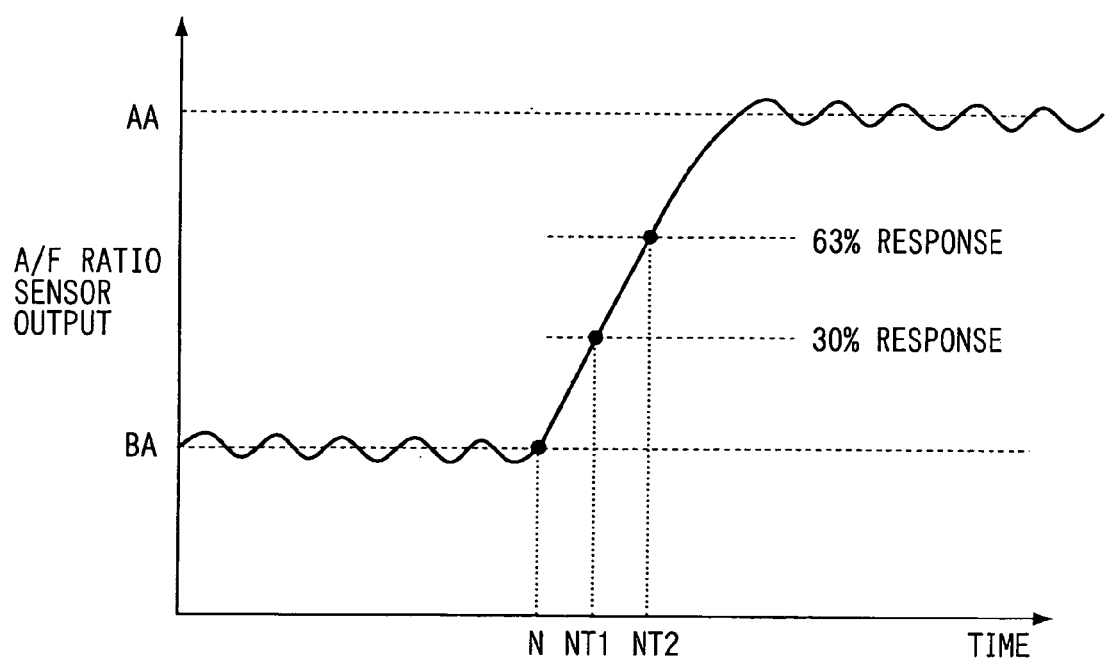
FIG. 11 is a time chart illustrating the method of detecting response characteristics according to an embodiment 3.

The method of calculating the dead time will now be described by way of the embodiment 3 of the invention illustrated in FIGS. 11 and 12. In this embodiment 3, a routine for calculating the dead time of FIG. 12 is executed to detect two response times (e.g., 30% response time NT1 and 63% response time NT2) to estimate an approximation (transfer function) of a curve of change in the sensor output of the 1st-order delay.

Figure 12:
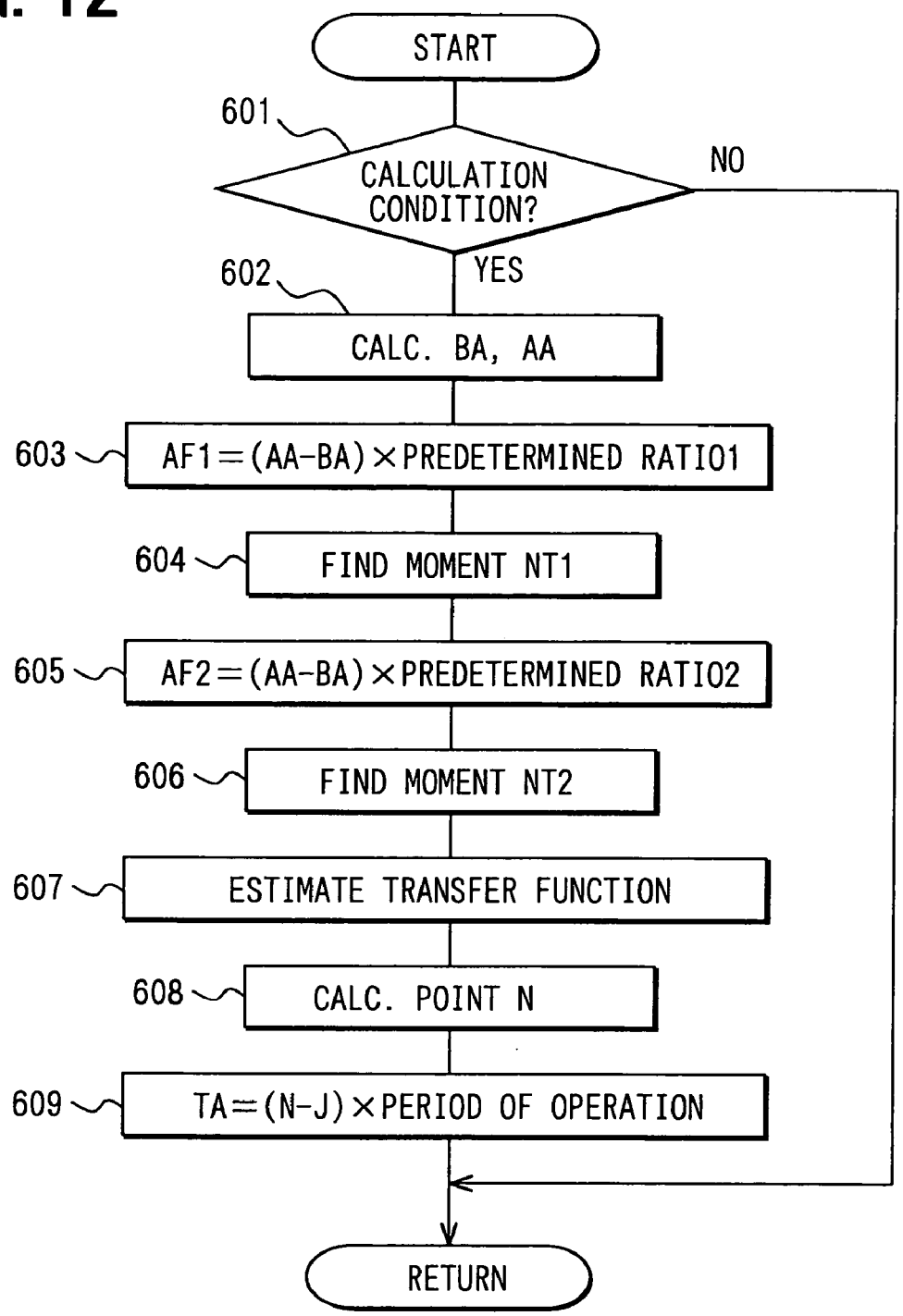
FIG. 12 is a flowchart illustrating the flow of a processing of a routine for calculating the dead time according to the embodiment 3.

The routine for calculating the dead time of FIG. 12 is periodically executed while the engine is in operation. At step 601, first, it is determined if the dead time calculation condition is holding. The dead time calculation condition is such that (1) a measurement processing flag is OFF (measurement of the response characteristics has been finished) and (2) the dead time TA has not been calculated yet. If either one of these two conditions (1) and (2) is not satisfied, the dead time calculation condition does not hold, and the main routine ends without executing the subsequent processing.

If the above two conditions (1) and (2) are simultaneously satisfied, there holds the dead time calculation condition, and the routine proceeds to step 602 to calculate the steady value BA of the sensor output of before the amount of the fuel is increased and the steady value AA of the sensor output of after the amount of the fuel is increased based on the time series data in the sensor output stored in the memory of the ECU 27. Thereafter, the routine proceeds to step 603 to calculate a sensor output AF1 corresponding to a predetermined ratio 1 (e.g., 30%) of the change (AA–BA) of from the steady value BA of before amount of the fuel is increased up to the steady value AA of after the amount of the fuel is increased, according to the following formula, $$AF1 = (AA-BA) \times \text{predetermined ratio 1}$$

Thereafter, the routine proceeds to step 604 to retrieve the time series data in the sensor output stored in the memory of the ECU 27 and to find a moment NT1 (30% response time) at which the sensor output has reached AF1.

At next step 605, the routine calculates a sensor output AF2 corresponding to a predetermined ratio 2 (e.g., 63%) of the change (AA−BA) of from the steady value BA of before the amount of the fuel is increased up to the steady value AA of after the amount of the fuel is increased, according to the following formula, $$AF2=(AA-BA)\times \text{ predetermined ratio 2}$$

Thereafter, the routine proceeds to step 606 to retrieve the time series data in the sensor output stored in the memory of the ECU 27 and to find a moment NT2 (63% response time) at which the sensor output has reached AF2.

After the 30% response time NT1 and the 63% response time NT2 are found as described above, the routine proceeds to step 607 to estimate an approximation (transfer function) of a curve of change in the sensor output of the 1st-order delay with the use of the response time NT1 and the 63% response time NT2. The transfer function is expressed as given below, $$G(s)=1/(1+T\times s)$$

Thereafter, the routine proceeds to step 608 to calculate a point where the estimated curve of change in the sensor output of the 1st-order delay intersects the steady value BA of before the amount of the fuel is increased, as a point N of start of change. Here, a response point of a predetermined ratio (e.g., 10% response point) may be calculated as the point N of start of change.

Thereafter, the routine proceeds to step 609 to calculate the dead time TA from the timing (j) of increasing the amount of the fuel until the point N of start of change according to the following formula, $$TA=(N-J)\times \text{ period of operation}$$

In the above embodiment 3, the two response times NT1 and NT2 are detected to estimate the approximation (transfer function) of the curve of change in the sensor output of the 1st-order delay, to estimate a point N of start of change based on the curve of change in the sensor output and on the steady value BA of before the amount of the fuel is increased in order to calculate the dead time TA by using the point N of start of change. Therefore, the point of start of change (dead time) can be precisely estimated even when the noise is great near the point N of start of change.

When the approximation of the curve of change in the sensor output of the 1st-order delay is to be estimated, three or more response times may be detected.

Further, when the approximation of the curve of change in the sensor output of the 2nd-order delay is to be estimated, three or more response times may be detected. In effect, the response times of a number of not less than n+1 may be detected when the approximation of the curve of change in the sensor output of the n-order delay is to be estimated.

The approximation (transfer function) of the curve of change in the sensor output of the 2nd-order delay is expressed by the following formula, $$G(s)=\omega^2/(s^2+2\times\zeta\times\omega\times s+\omega^2)$$

where $\omega$ is a specific angular frequency and $\zeta$ is a damping coefficient.

Further, the method of calculating the dead time of the embodiment 1 (or the embodiment 2) and the method of calculating the dead time of the embodiment 3 may be used being changed over depending upon the amount of change in the sensor output of before the amount of feeding the fuel is changed or depending upon the operating conditions. In the operation region where, for example, the noise is estimated to be relatively small based on the amount of change in the sensor output of before the amount of feeding the fuel is changed or based on the operating condition, the dead time is calculated by selecting the method of calculating the dead time of the embodiment 1 (or the embodiment 2). In the operation region where the noise is estimated to be relatively large based on the amount of change in the sensor output of before the amount of feeding the fuel is changed or based on the operating condition, on the other hand, the dead time may be calculated by selecting the method of calculating the dead time of the embodiment 3. As described above, the method of calculating the dead time of the embodiment 1 (or the embodiment 2) or the method of calculating the dead time of the embodiment 3 is used depending upon the intensity of noise to precisely calculate the dead time without affected by the intensity of noise.

Embodiment 4

In the embodiment 4 of the invention, threshold values for judging a normal range (permissible values ΔTA, ΔTB and ΔTAB) are set based on at least any one of the operation parameter (e.g., amount of injecting the fuel) that affects the response of the air-fuel ratio sensor 24, noise detection data superposed on the output of the air-fuel ratio sensor 24 and the engine operating conditions (e.g., engine rotational speed, amount of the air taken in) at the time of diagnosing an fail condition in the air-fuel ratio sensor 24 by using the routine for diagnosing an fail condition in the air-fuel ratio sensor of FIG. 7 based on the responsivity (the dead time TA, the response time TB, the detection time TAB) or by using any other routine for diagnosing an fail condition in the air-fuel ratio sensor, and any fail condition in the air-fuel ratio sensor 24 is determined by using the above threshold values that are set for determining the normal range.

Figure 13:
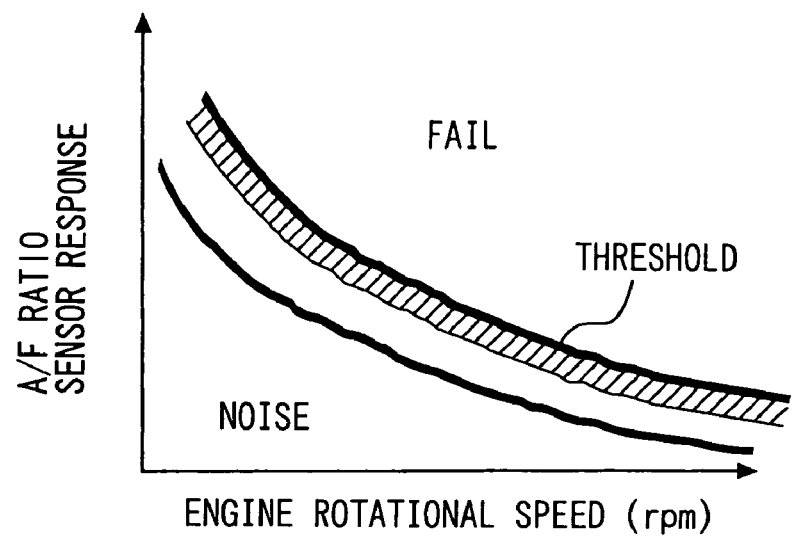
FIG. 13 is a diagram illustrating a map of threshold values for determining a normal range according to an embodiment 4.

In the embodiment 4, the threshold values for determining the normal range are set based on the engine rotational speed which is the engine operating condition that affects the noise superposed on the output of the air-fuel ratio sensor 24 by making a reference to a map of FIG. 13, and the response characteristics of the air-fuel ratio sensor 24 are compared with the threshold values for determining the normal range to determine the presence of an fail condition in the air-fuel ratio sensor 24.

This makes it possible to set suitable threshold values for determining a normal range depending upon the engine operating conditions that affect noise in the air-fuel ratio sensor 24 and to diagnose an fail condition in the air-fuel ratio sensor 24 maintaining a high precision excluding the effect of noise. Besides, the fail condition in the air-fuel ratio sensor 24 can be diagnosed even at such engine rotational speeds that produce relatively large noise, making it possible to increase the frequency for diagnosing the fail condition and to detect the fail condition in the air-fuel ratio sensor 24 in an early time.

The parameters used for setting the threshold values for determining the normal range may be the engine operating conditions such as the amount of the air taken in and the like other than the engine rotational speed, or may be the operation parameters (e.g., amount of injecting the fuel, etc.) that affect the noise detection data superposed on the output of the air-fuel ratio sensor 24 or affect the response of the air-fuel ratio sensor 24.

Embodiment 5

In the embodiment 5 of the invention, the response characteristics (dead time and n-order delay characteristics) of the air-fuel ratio sensor 24 are detected under a predetermined operating condition, and the response characteristics under other operating conditions are estimated based on a relationship between the predetermined operating condition and the response characteristics.

Figure 14:
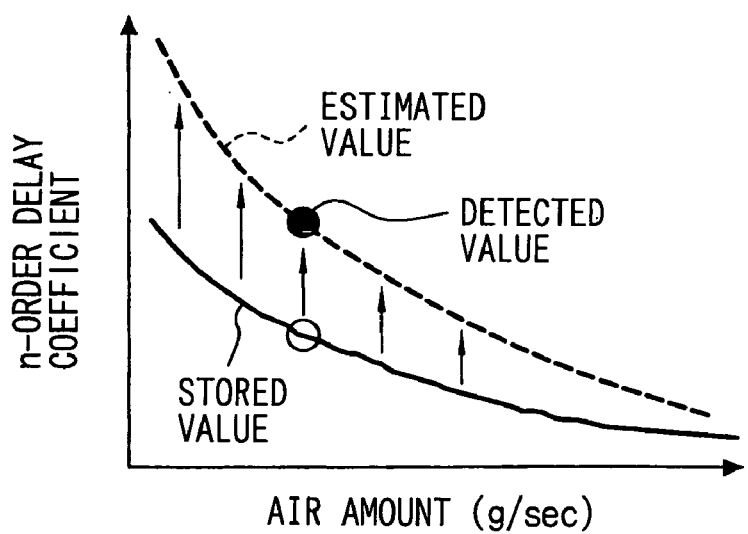
FIG. 14 is a diagram illustrating a method of estimating response characteristics of the air-fuel ratio sensor according to an embodiment 5.

This will now be concretely described. Referring, for example, to FIG. 14, a relationship between the amount of the air taken in and the n-order delay characteristic coefficient (or dead time) is stored in the ROM (nonvolatile memory) in the ECU 27 in the form of a map or numerical formula based on the experimental data or the design values. When the n-order delay characteristic coefficient (or dead time) is detected with a predetermined amount of the air taken in while the engine is in operation, the relationship (map value or numerical formula) between the amount of the air taken in and the n-order delay characteristic coefficient is corrected based upon the detected value, and the n-order delay characteristic coefficient (or dead time) is estimated with the other amount of the air taken in. Here, the n-order delay characteristic coefficient (or dead time) under other operating conditions may be estimated by detecting a relationship between the operating condition (e.g., engine rotational speed) other than the amount of the air taken in and the n-order delay characteristic coefficient (or dead time).

Therefore, even under an operating condition where the response characteristics are not being detected (measured), the response characteristics can be estimated based upon the results of detection under other operating conditions making it possible to diagnose an fail condition in the sensor based on the estimated value or to change or correct the air-fuel ratio feedback control parameter. Therefore, there is no need of detecting (measuring) the response characteristics under all operating conditions, and the number of steps for detection can be decreased. Besides, the response characteristics can be estimated even under the operating conditions where it is difficult to detect the response characteristics while the engine is in operation.

Embodiment 6

Figure 15:
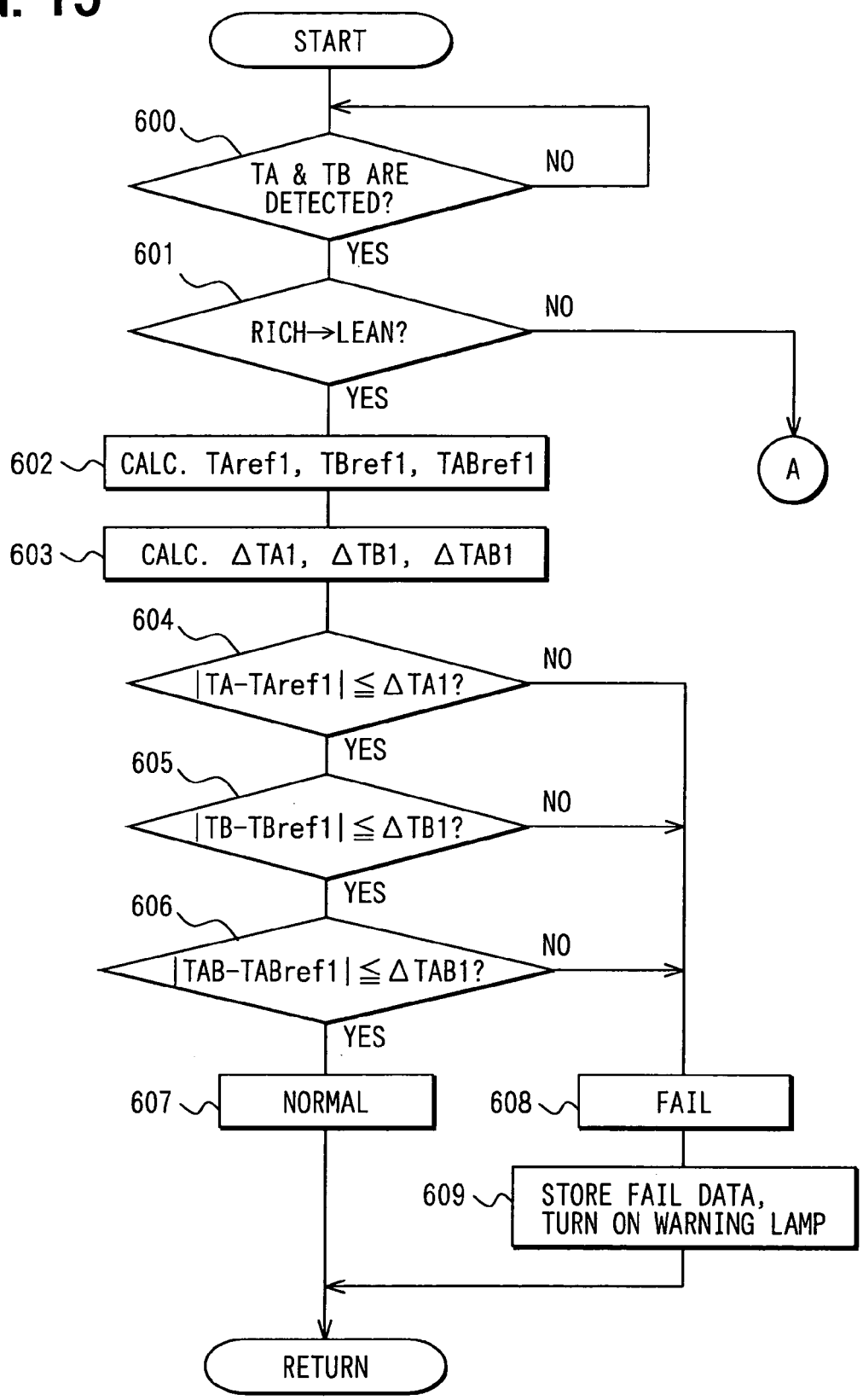
FIG. 15 is a flowchart (part 1) illustrating the flow of a processing of a routine for diagnosing a fail condition in the air-fuel ratio sensor according to an embodiment 6.
Figure 16:
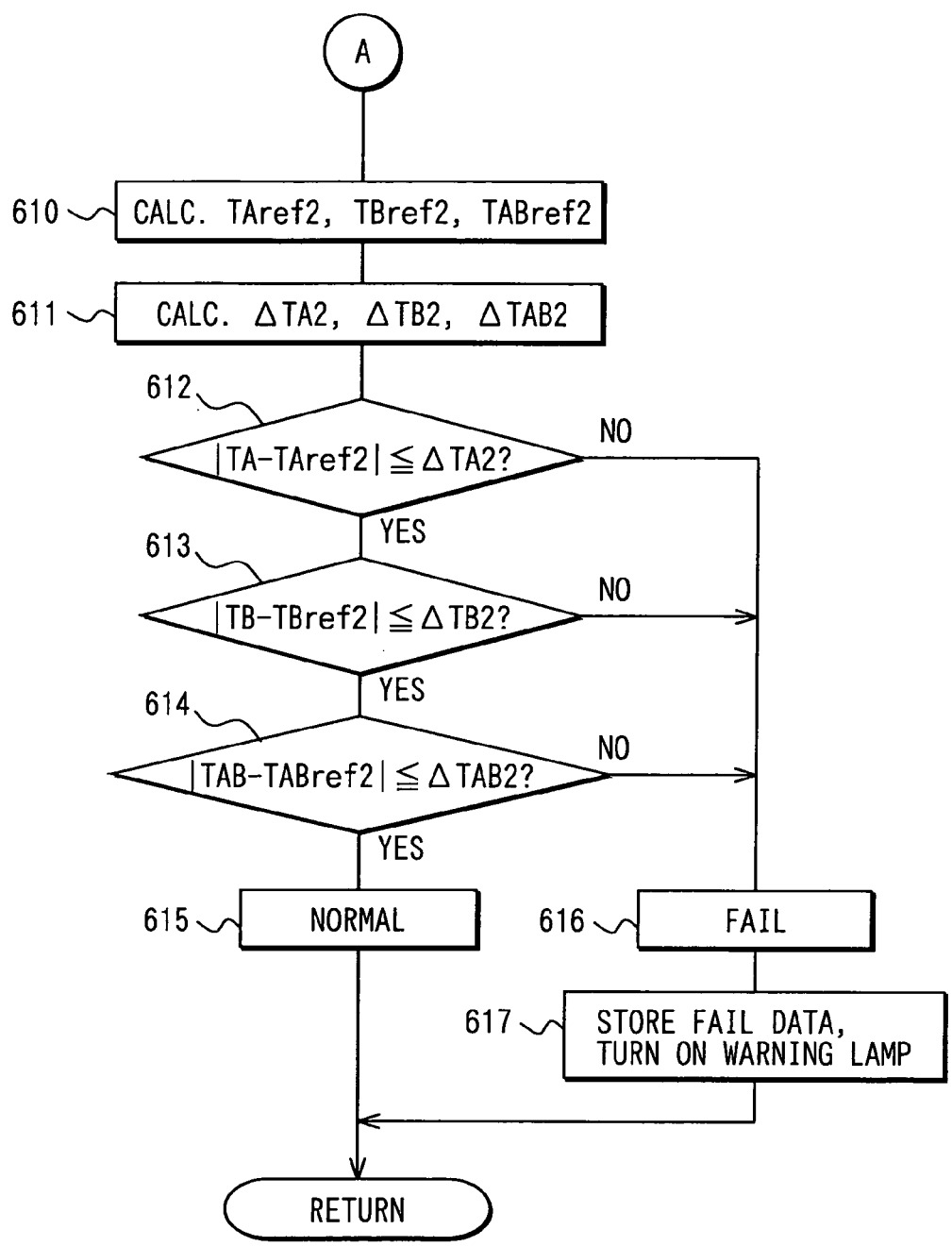
FIG. 16 is a flowchart (part 2) illustrating the flow of the processing of the routine for diagnosing a fail condition in the air-fuel ratio sensor according to the embodiment 6.

In the embodiment 6 of the invention, a routine for diagnosing an fail condition in the air-fuel ratio sensor shown in FIGS. 15 and 16 is executed to detect the response characteristics (dead time TA, response time TB, detection time TAB) of the air-fuel ratio sensor 24 when the output of the air-fuel ratio sensor 24 varies from rich to lean or from lean to rich, and to determine the presence of an fail condition in the air-fuel ratio sensor 24 based on the response characteristics. In the embodiment 6 in this case, the fail condition in the air-fuel ratio sensor 24 is diagnosed by using diagnosing conditions which differ depending on the directions in which the output of the air-fuel ratio sensor 24 varies by taking into consideration the fact that the response characteristics differ to some extent depending upon when the output of the air-fuel ratio sensor 24 varies from rich to lean and from lean to rich.

Described below is the content of processing of the routine for diagnosing a fail condition in the air-fuel ratio sensor of FIGS. 15 and 16. This routine is a subroutine executed at step 110 of the main routine for detecting the air-fuel ratio sensor response characteristics of FIG. 4 and plays the role of fail condition determining means referred to in claims. Upon being started, the routine stands by at step 600 until the dead time TA and the response time TB are calculated by the routines of FIGS. 5 and 6. At a moment when the dead time TA and the response time TB are calculated, the routine proceeds to step 601 to determine if a change in the output of the air-fuel ratio sensor 24 is from rich to lean. If the change is from rich to lean, the routine proceeds to step 602 where the standard dead time TAref1, standard response time TBref1 and standard detection time TABref1 at the time of change of from rich to lean, are calculated by using maps depending upon the present engine operating conditions. Here, the standard dead time TAref1 is a standard dead time TA at the time of change of from rich to lean, the standard response time TBref1 is a standard response time TB at the time of change of from rich to lean, and the standard detection time TABref1 is a standard value of the total time (=detection time TAB) of the dead time TA and the response time TB at the time of change of from rich to lean.

Thereafter, the routine proceeds to step 603 to calculate permissible errors $\Delta TA1$, $\Delta TB1$ and $\Delta TAB1$ for the dead time TA, response time TB and detection time TAB at the time of change of from rich to lean by using maps depending upon the present engine operating conditions.

At next step 604, it is determined if a difference between the dead time TA and the standard dead time TAref1 at the time of change of from rich to lean is smaller than the permissible error $\Delta TA1$. If this difference is greater than the permissible error $\Delta TA1$, the routine proceeds to step 608 to determine that the air-fuel ratio sensor 24 is failed.

On the other hand, if it is determined at step 604 that the difference between the dead time TA and the standard dead time TAref1 at the time of change of from rich to lean is smaller than the permissible error $\Delta TA1$, the routine proceeds to step 605 to determine if a difference between the response time TB and the standard response time TBref1 at the time of change of from rich to lean is smaller than the permissible error $\Delta TB1$. If the difference is greater than the permissible error $\Delta TB1$, the routine proceeds to step 608 to determine that the air-fuel ratio sensor 24 is failed.

On the other hand, if it is determined at step 605 that the difference between the response time TB and the standard response time TBref1 at the time of change of from rich to lean is smaller than the permissible error $\Delta TB1$, the routine proceeds to step 606 to determine if a difference between the detection time TAB and the standard detection time TABref1 at the time of change of from rich to lean is smaller than the permissible error $\Delta TAB1$.

Here, there has been set a relationship $\Delta TAB1 < \Delta TA1 + \Delta TB1$. If it is determined at step 606 that the difference between the detection time TAB and the standard detection time TABref1 at the time of change of from rich to lean is greater than the permissible error $\Delta TAB1$, the routine proceeds to step 608 to determine that the air-fuel ratio sensor 24 is failed.

When the fail condition is detected in the air-fuel ratio sensor 24 at the time of change of from rich to lean as described above, the routine proceeds to step 609 where the fail data is stored in the rewritable nonvolatile memory (not shown) such as the backup RAM in the ECU 27, and the warning lamp 32 is turned on or flashed and the warning is displayed on the display unit (not shown) on the instrument panel at the driver's seat to warn the driver.

When the determination is all "YES" at steps 604 to 606, on the other hand, the routine proceeds to step 607 to determine that the air-fuel ratio sensor 24 is normal.

When it is determined at step 601 that the change is from lean to rich, the routine proceeds to step 610 of FIG. 16 where the standard dead time TAref2, standard response time TBref2 and standard detection time TABref2 at the time of change of from lean to rich, are calculated by using maps depending upon the present engine operating conditions. Here, the standard dead time TAref2 is a standard dead time TA at the time of change of from lean to rich, the standard response time TBref2 is a standard response time TB at the time of change of from lean to rich, and the standard detection time TABref2 is a standard value of the total time (=detection time TAB) of the dead time TA and the response time TB at the time of change of from lean to rich.

Thereafter, the routine proceeds to step 611 to calculate permissible errors ΔTA2, ΔTB2 and ΔTAB2 for the dead time TA, response time TB and detection time TAB at the time of change of from lean to rich by using maps depending upon the present engine operating conditions.

At next step 612, it is determined if a difference between the dead time TA and the standard dead time TAref2 at the time of change of from lean to rich is smaller than the permissible error ΔTA2. If this difference is greater than the permissible error ΔTA2, the routine proceeds to step 616 to determine that the air-fuel ratio sensor 24 is failed.

On the other hand, if it is determined at step 612 that the difference between the dead time TA and the standard dead time TAref2 at the time of change of from lean to rich is smaller than the permissible error ΔTA2, the routine proceeds to step 613 to determine if a difference between the response time TB and the standard response time TBref2 at the time of change of from lean to rich is smaller than the permissible error ΔTB2. If the difference is greater than the permissible error ΔTB2, the routine proceeds to step 616 to determine that the air-fuel ratio sensor 24 is failed.

On the other hand, if it is determined at step 613 that the difference between the response time TB and the standard response time TBref2 at the time of change of from lean to rich is smaller than the permissible error ΔTB2, the routine proceeds to step 614 to determine if a difference between the detection time TAB and the standard detection time TABref2 at the time of change of from lean to rich is smaller than the permissible error ΔTAB2.

Here, there has been set a relationship ΔTAB2<ΔTA2+ΔTB2. If it is determined at step 614 that the difference between the detection time TAB and the standard detection time TABref2 at the time of change of from lean to rich is greater than the permissible error ΔTAB2, the routine proceeds to step 608 to determine that the air-fuel ratio sensor 24 is failed.

When the fail condition is detected in the air-fuel ratio sensor 24 at the time of change of from lean to rich as described above, the routine proceeds to step 617 where the fail data is stored in the rewritable nonvolatile memory (not shown) such as the backup RAM in the ECU 27, and the warning lamp 32 is turned on or flashed and the warning is displayed on the display unit (not shown) on the instrument panel at the driver's seat to warn the driver.

When the determination is all "YES" at steps 604 to 606, on the other hand, the routine proceeds to step 607 to determine that the air-fuel ratio sensor 24 is normal.

According to the embodiment 6 described above, the response characteristics of the air-fuel ratio sensor 24 are detected at the time of change of from rich to lean and from lean to rich, respectively, the presence of an fail condition in the air-fuel ratio sensor 24 is determined based on the response characteristics, and the fail condition in the air-fuel ratio sensor 24 is diagnosed under a diagnosing condition that differs depending upon a direction in which the output of the air-fuel ratio sensor 24 changes by taking into consideration the fact that the response characteristics differ to some extent depending upon a change from rich to lean and a change from lean to rich. Therefore, the fail condition can be highly precisely diagnosed irrespective of if the output of the air-fuel ratio sensor 24 changes into rich or lean offering, further, such an advantage that the fail portion in the air-fuel ratio sensor 24 can be specified depending upon in which direction of rich or lean the fail condition has occurred. Here, in this invention, it needs not be pointed out that the fail condition in the air-fuel ratio sensor 24 may be diagnosed under the same condition irrespective of the direction in which the output of the air-fuel ratio sensor 24 changes.

Here, in conducting the processing for measuring the dead time or the response time at the time of change from rich to lean or from lean to rich, the air-fuel ratio sensor 24 may be determined to be fail in case the processing time exceeds the normal range. Then, during the processing of measurement at the time of change of from rich to lean or from lean to rich, the processing of measurement may be interrupted at a moment when it is detected that the dead time is abnormally lengthened or when it is detected that the response time is abnormally lengthened to readily determine that the air-fuel ratio sensor 24 is failed. This makes it possible to detect the fail condition at an early time in case the fail condition has occurred in the air-fuel ratio sensor 24 and to prevent the measuring time from being abnormally lengthened. In this case, the normal range of the processing time may be differed depending upon a change of from rich to lean and a change of from lean to rich by taking into consideration the fact that the response characteristics of the air-fuel ratio sensor 24 differ to some extent depending upon a change of from rich to lean and a change of from lean to rich.

Other Embodiments

The methods of calculating the response characteristics of the air-fuel ratio sensor 24 are not limited to those of the above embodiments. For example, there may be employed a parametric method which is a generally employed system identification method or a non-parametric method to calculate the response characteristics of the air-fuel ratio sensor 24.

Figure 17:
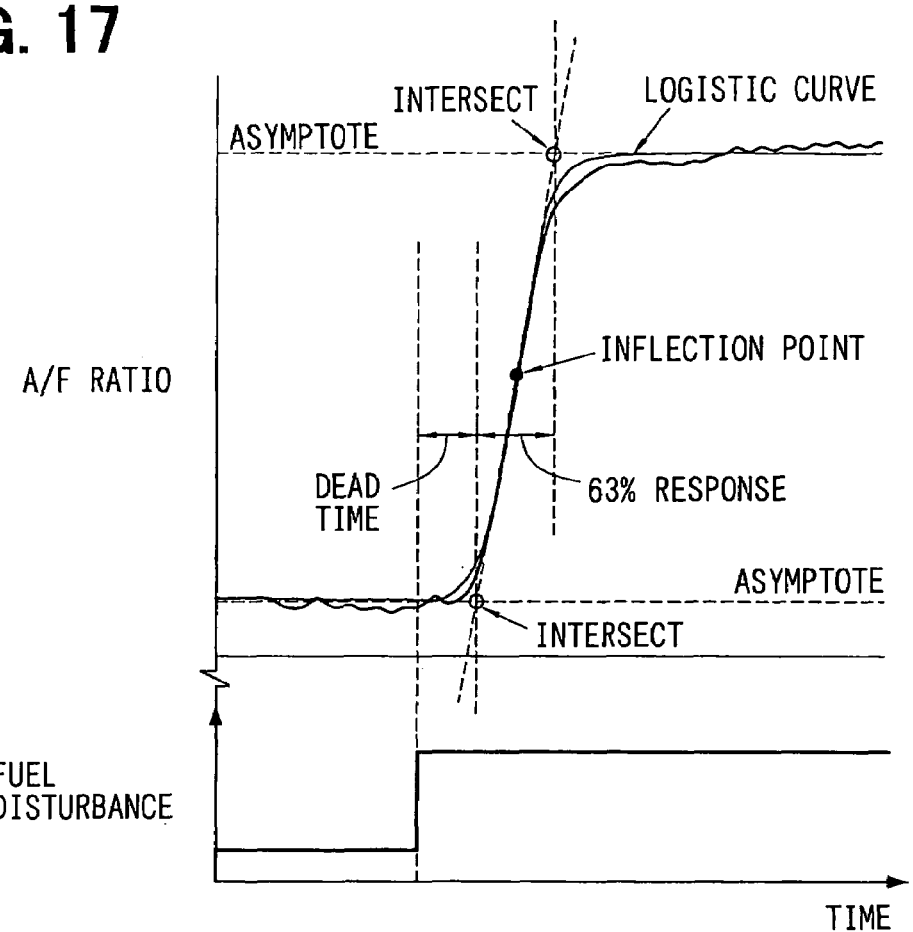
FIG. 17 is a diagram illustrating a method of calculating a 63% response time based on a non-parametric method.

According to the non-parametric method as shown in FIG. 17, the step response is approximated by a character S to draw a logistic curve, a tangential line is drawn at an inflection point on the logistic curve to find points where the tangential line intersects two asymptotes, and the time between the two intersecting points is regarded to be a 63% response time.

When a ratio of change in the output of the air-fuel ratio sensor 24 has been known, the inclination of the tangential line at the 50% response time may be found in a simplified manner to regard the twice of the inclination as the 63% response time.

According to the parametric method, on the other hand, the system is identified by using an ARX model (dead time+1 st-order delay) with the input as a fuel disturbance and the output as an air-fuel ratio (air excess ratio λ) to calculate the 63% response time. The parametric method is capable of handling the continuous data (the step response needs not be measured) and is considered to exhibit its effect by using signals without noise or by using signals of when the cause of noise has been known and when the noise can be separated.

Figure 18:
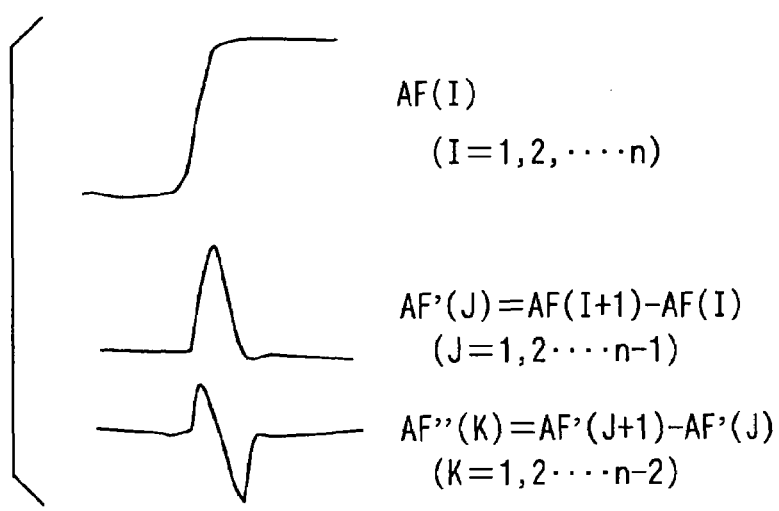
FIG. 18 is a diagram illustrating a relationship between the sensor output AF (I) and first-order difference AF'(J) and the second-order difference AF"(K).

At step 203 in the routine for calculating the dead time of FIG. 5, further, the gradient of change in the sensor output AF (I) is found as the first-order difference AF'(J)[=AF(I+1)−AF (I)]. This, however, may be found as the second-order difference AF"(K)[=AF'(J+1)−AF'(J)](see FIG. 18).

In the routines for diagnosing the fail condition in the air-fuel ratio sensor of FIGS. 7, 15 and 16, further, the occurrence of disturbance in the air-fuel ratio may be estimated and the diagnosis of fail condition in the air-fuel ratio sensor 24 may be inhibited when the following conditions are holding for inhibiting the diagnosis of fail conditions.

(1) During the transient operation.
(2) When the EGR (exhaust gas reflux control) is being executed.
(3) When the intake system is being purged with the evaporated gas (fuel evaporation gas)(or when the concentration of the evaporated gas is high).
(4) When misfire has occurred.
(5) When the result of self-diagnosis of the fuel system is failed.

If even any one of these five conditions (1) to (5) applies, the condition for inhibiting the fail diagnosis is holding, and the diagnosis of the fail condition is inhibited.

This prevents erroneous diagnosis of fail condition caused by the disturbance in the air-fuel ratio, and makes it possible to improve the reliability of diagnosis of fail conditions.

In diagnosing the fail conditions in the air-fuel ratio sensor 24 by using the routines for diagnosing the fail conditions in the air-fuel ratio sensor of FIGS. 7, 15 and 16, average values of a predetermined number of times of diagnosis may be used as the response characteristics detection values (dead time, response time, detection time). Or, average values of the predetermined number of times of diagnosis may be used as differences between the response characteristics detection values (dead time, response time, detection time) and the standard values thereof. In either case, dispersion due to noise can be decreased in the response characteristics detection values preventing erroneous diagnosis of fail conditions caused by noise.

What is claimed is:

1. Apparatus for detecting response characteristics of an air-fuel ratio control system sensor that provides feedback control of fuel fed into an internal combustion engine based on sensor output that represents an air-fuel ratio or oxygen concentration of exhaust gas emitted from the internal combustion engine, said apparatus comprising:
   means for determining fuel change timing at which an amount of fuel fed into the internal combustion engine changes; and
   for detecting sensor step response characteristics by monitoring behavior of the sensor output before and after a change in the fed amount of fuel, and by detecting response characteristics of the sensor including dead time from a moment when the amount of fed fuel is changed until the sensor output starts changing and subsequent n-order delay characteristics (n being a positive integer) representing a change in sensor output.

2. Apparatus for detecting response characteristics of a sensor as in claim 1, further comprising:
   means for determining sensor fail condition by relying at least upon either the detected dead time or the detected n-order delay characteristics.

3. Apparatus for detecting response characteristics of a sensor as in claim 2, further comprising: means for setting a normal range based on at least any one of(a) an operation parameter that affects response characteristics of the sensor, (b) noise detection data superposed on the sensor output, and (c) an operating condition of the internal combustion engine;
   wherein the means for determining a sensor fail condition determines a sensor fail condition relying upon the set normal range.

4. Apparatus for detecting response characteristics of a sensor as in claim 2, further comprising:
   means for producing a warning when the means for determining a sensor fail condition determines that the sensor is failed.

5. Apparatus for detecting response characteristics of a sensor as in claim 2, wherein:
   the means for detecting step response characteristics detects response characteristics of the sensor under a predetermined operating condition, and estimates the response characteristics under other operating conditions.

6. Apparatus for detecting response characteristics of a sensor as in claim 2, wherein:
   the means for determining sensor fail condition determines the presence of a sensor fail condition when the sensor output has changed from rich to lean and from lean to rich, respectively.

7. Apparatus for detecting response characteristics of a sensor as in claim 1, further comprising:
   means for determining a sensor fail condition when processing time exceeds a normal range during detection of the dead time or the n-order delay characteristics.

8. Apparatus for detecting response characteristics of a sensor as in claim 1, further comprising:
   means for changing or correcting an air-fuel ratio feedback control parameter relying at least upon either (a) the detected dead time or (b) the detected n-order delay characteristics.

9. Apparatus for detecting response characteristics of a sensor as in claim 1, wherein:
   the means for detecting step response characteristics detects the dead time and the n-order delay characteristics by varying the amount of fed fuel by step-wise inputting changes while the internal combustion engine is in steady operation near a target air-fuel ratio.

10. Apparatus for detecting response characteristics of a sensor as in claim 1, wherein:
    the means for detecting step response characteristics detects a start change time point at which the sensor output starts changing after the amount of fed fuel has been changed, and detects the elapsed time from starting to change the amount of fed fuel to the stall change time point the dead time.

11. Apparatus for detecting response characteristics of a sensor as in claim 10, wherein:
    the means for detecting step response characteristics detects a gradient change time point at which a change of gradient in sensor output exceeds a threshold value after a change in the amount of fed fuel as a start change time.

12. Apparatus for detecting response characteristics of a sensor as in claim 1, wherein:
    the means for detecting step response characteristics detects a start change time point successively until the change of gradient in sensor output exceeds the threshold value a predetermined number of times after a change in the amount of fed fuel.

13. Apparatus for detecting response characteristics of a sensor as in claim 11, further comprising:
means for setting a threshold value based on an operation parameter that affects noise superposed on the sensor output or based on noise detection data.

14. Apparatus for detecting response characteristics of a sensor as in claim 1, wherein:
the means for detecting step response characteristics (a) detects a number of response times not less than n+1 to estimate a change curve in sensor output of the n-order delay, (b) estimates a change start point at which the sensor output starts changing after the amount of fed fuel has been changed based on the change curve and the sensor output in steady state before the amount of fed fuel is changed, and (c) calculates dead time by using the change start point.

15. Apparatus for detecting response characteristics of a sensor as in claim 1, wherein the means for detecting step response characteristics includes:
first means for calculating dead time which (a) detects a start change time point at which the sensor output starts changing after the amount of fed fuel has been changed, and (b) detects elapsed time from the time at which the amount of fed fuel is changed until the start change point as the dead time; and
second means for detecting dead time which detects a number of response times not less than n+1 to (a) estimate a change curve in sensor output of the n-order delay, (b) estimate a start change point based on the change curve in sensor output and on steady state sensor output before the amount of fed fuel is changed, and (c) calculates dead time by using the start change point,
wherein the means for detecting step response characteristics calculates dead time by selecting either one of (a) the first dead time calculation means or (b) the second dead time calculation means depending upon the amount of sensor output change before the amount of fed fuel is changed or upon operating conditions.

16. Apparatus for detecting response characteristics of a sensor as in claim 1, wherein:
the means for detecting step response characteristics calculates a response time or a coefficient of transfer function of the n-order delay before the amount of change in sensor output reaches a predetermined ratio at the time of detecting n-order delay characteristics.

17. Apparatus for detecting response characteristics of a sensor as in claim 16, wherein:
the means for detecting step response characteristics (a) calculates an amount of change in sensor output when detecting the n-order delay characteristics based on steady state sensor output before the amount of fed fuel is changed, and (b) calculates a response time until the amount of change reaches a predetermined ratio of the steady state output after the amount of fed fuel is changed from the steady state.

18. Apparatus for detecting response characteristics of a sensor as in claim 16, wherein in detecting the n-order delay characteristics, the means for detecting step response characteristics (a) detects a number of response times not less than n+1, and (b) calculates a coefficient of transfer function that represents a response of the n-order delay based not less than n+1 of said response times.

19. A method for detecting response characteristics of an air-fuel ratio control system sensor that provides feedback control of fuel fed into an internal combustion engine based on sensor output that represents an air-fuel ratio or oxygen concentration of exhaust gas emitted from the internal combustion engine, said method comprising:
determining fuel change timing at which an amount of fuel fed into the internal combustion engine changes; and
detecting sensor step response characteristics by monitoring behavior of the sensor output before and after a change in the fed amount of fuel, and detecting response characteristics of the sensor including dead time from a moment when the amount of fed fuel is changed until the sensor output starts changing and subsequent n-order delay characteristics (n being a positive integer) representing a change in sensor output.

20. A method as in claim 19, further comprising:
determining a sensor fail condition by relying at least upon either the detected dead time or the detected n-order delay characteristics.

21. A method as in claim 20, further comprising:
setting a normal range based on at least any one of (a) an operation parameter that affects response characteristics of the sensor, (b) noise detection data superposed on the sensor output, and (c) an operating condition of the internal combustion engine;
wherein sensor fail condition is determined relying upon the set normal range.

22. A method as in claim 20, wherein:
step response characteristics are detected by detecting response characteristics of the sensor under a predetermined operating condition, and estimating the response characteristics under other operating conditions.

23. A method as in claim 20, wherein:
determining sensor fail condition determines the presence of a sensor fail condition when the sensor output has changed from rich to lean and from lean to rich, respectively.

24. A method as in claim 19, further comprising:
determining a sensor fail condition when processing time exceeds a normal range during detection of the dead time or the n-order delay characteristics.

25. A method as in claim 19, further comprising:
producing a warning when it is determined that the sensor has failed.

26. A method as in claim 19, further comprising:
changing or correcting an air-fuel ratio feedback control parameter relying at least upon either (a) the detected dead time or (b) the detected n-order delay characteristics.

27. A method as in claim 19, wherein:
step response characteristics of dead time and n-order delay characteristics are detected by step-wise varying the amount fed fuel while the internal combustion engine is in steady operation near a target air-fuel ratio.

28. A method as in claim 19, wherein:
step response characteristics are detected by detecting a start change time point at which the sensor output starts changing after the amount of fed fuel has been changed, and detecting the elapsed time from starting to change the amount of fed fuel and the start change time point as the dead time.

29. A method as in claim 28, wherein:
step response characteristics are detected by detecting a gradient change time point at which a change of gradient in sensor output exceeds a threshold value after a change in the amount of fed fuel as a start change time.

30. A method as in claim 29, wherein:
step response characteristics are detected by detecting a start change time point successively until the change of gradient in sensor output exceeds the threshold value a predetermined number of times after a change in the amount of fed fuel.

31. A method as in claim 29, further including:
setting a threshold value based on an operation parameter that affects noise superposed on the sensor output or based on noise detection data.

32. A method as in claim 19, wherein:
step response characteristics are detected by: (a) detecting a number of response times not
less than n+1 to estimate a change curve in sensor output of the n-order delay, (b) estimating a change start point at which the sensor output starts changing after the amount of fed fuel has been changed based on the change curve and the sensor output in steady state before the amount of fed fuel is changed, and (c) calculating dead time by using the change start point.

33. A method as in claim 19, wherein detecting the step response characteristics includes:
calculating dead time by detecting: (a) a start change time point at which the sensor output starts changing after the amount of fed fuel has been changed, and (b) elapsed time from the time at which the amount of fed fuel is changed until the start change point as the dead time; and
second calculating dead time by detecting a number of response times not less than n+1 to (a) estimate a change curve in sensor output of the n-order delay, (b) estimating a start change point based on the change curve in sensor output and on steady state sensor output before the amount of fed fuel is changed, and (c) calculating dead time by using the start change point;
wherein the step response characteristics are detected with dead time being selected as either one of (a) the first dead time calculation or (b) the second dead time calculation depending upon the amount of sensor output change before the amount of fed fuel is changed or upon operating conditions.

34. A method as in claim 19, wherein:
step response characteristics are detected by calculating a response time or a coefficient of transfer function of the n-order delay before the amount of change in sensor output reaches a predetermined ratio at the time of detecting n-order delay characteristics.

35. A method as in claim 34, wherein:
step response characteristics are detected by: (a) calculating an amount of change in sensor output when detecting the n-order delay characteristics based on steady state sensor output before the amount of fed fuel is changed, and (b) calculating a response time until the amount of change reaches a predetermined ratio of the steady state output after the amount of fed fuel is changed from the steady state.

36. A method as in claim 34, wherein in detecting the n-order delay characteristics, the detecting of step response characteristics (a) detects a number of response times not less than n+1, and (b) calculates a coefficient of transfer function that represents a response of the n-order delay based on not less than n+1 of said response times.

* * * * *